US012624234B2

(12) United States Patent
Skillman et al.

(10) Patent No.: US 12,624,234 B2
(45) Date of Patent: May 12, 2026

(54) LIQUID OR AEROSOL JET COATING COMPOSITIONS FOR SUBSTRATES, COATED SUBSTRATES AND METHODS OF COATING

(71) Applicant: SWIMC LLC, Cleveland, OH (US)

(72) Inventors: Charles I. Skillman, Zelienople, PA (US); Boxin Tang, Saint Paul, MN (US); Richard D. Joslin, Moon Township, PA (US); Joseph DeSousa, Pittsburgh, PA (US); Ted Robert Best, Lakeville, MN (US); Jade Y. Muns, Richfield, MN (US)

(73) Assignee: SWIMC LLC, Cleveland, OH (US)

(*) Notice: Subject to any disclaimer, the term of this patent is extended or adjusted under 35 U.S.C. 154(b) by 96 days.

(21) Appl. No.: 18/290,567

(22) PCT Filed: May 19, 2022

(86) PCT No.: PCT/US2022/030130
§ 371 (c)(1),
(2) Date: Nov. 14, 2023

(87) PCT Pub. No.: WO2022/246128
PCT Pub. Date: Nov. 24, 2022

(65) Prior Publication Data

US 2024/0254347 A1 Aug. 1, 2024

Related U.S. Application Data

(60) Provisional application No. 63/190,763, filed on May 19, 2021.

(51) Int. Cl.
*C09D 11/30* (2014.01)
*B05D 1/02* (2006.01)
(Continued)

(52) U.S. Cl.
CPC ................ *C09D 11/30* (2013.01); *B05D 1/02* (2013.01); *B05D 1/26* (2013.01); *C09D 11/10* (2013.01);
(Continued)

(58) Field of Classification Search
CPC .......... C09D 11/30; C09D 11/10; B05D 1/02; B05D 2202/15; B05D 2202/25;
(Continued)

(56) References Cited

U.S. PATENT DOCUMENTS

| | | |
|---|---|---|
| 5,464,884 A | 11/1995 | Nield et al. |
| 6,719,422 B2 | 4/2004 | Wu et al. |

(Continued)

FOREIGN PATENT DOCUMENTS

| | | | |
|---|---|---|---|
| DK | 2358541 T3 | 9/2015 | |
| EP | 3192843 A1 * | 7/2017 | ........... C09D 167/02 |

(Continued)

OTHER PUBLICATIONS

ASTM 2196, "Standard Test Methods for Rheological Properties of Non-newtonian Materials by Rotational Viscometer," Method A, ASTM Int'l, West Conshohocken, PA,2020: 5 pgs.

(Continued)

*Primary Examiner* — Yaovi M Ameh
(74) *Attorney, Agent, or Firm* — Mueting Raasch Group

(57) ABSTRACT

Liquid jet or aerosol jet coating compositions, coated coil substrates, and methods of coating a coil substrate are disclosed. The method may include directing a liquid jet or aerosol jet coating composition to at least a portion of the coil substrate. The liquid jet or aerosol jet coating composition may include polymer particles and a liquid carrier including water in a major amount of the liquid carrier. The method may include providing conditions effective for the liquid jet or aerosol jet coating composition to form a
(Continued)

hardened continuous adherent coating on at least a portion of the coil substrate.

20 Claims, 3 Drawing Sheets

(51) Int. Cl.
*B05D 1/26* (2006.01)
*C09D 11/10* (2014.01)

(52) U.S. Cl.
CPC ...... *B05D 2202/10* (2013.01); *B05D 2202/15* (2013.01); *B05D 2202/25* (2013.01); *B05D 2252/02* (2013.01); *B05D 2401/20* (2013.01); *B05D 2520/00* (2013.01)

(58) Field of Classification Search
CPC .. B05D 2401/20; B05D 2520/00; B05D 1/26; B05D 2202/10; B05D 2252/02
See application file for complete search history.

(56) References Cited

U.S. PATENT DOCUMENTS

| | | | | |
|---|---|---|---|---|
| 6,893,678 | B2 | 5/2005 | Hirose et al. | |
| 7,189,787 | B2 | 3/2007 | O'Brien | |
| 7,198,849 | B2 | 4/2007 | Stapperfenne et al. | |
| 7,279,506 | B2 | 10/2007 | Sisler et al. | |
| 7,592,047 | B2 | 9/2009 | O'Brien et al. | |
| 7,803,415 | B2 | 9/2010 | Kiefer-Liptak et al. | |
| 7,910,170 | B2 | 3/2011 | Evans et al. | |
| 7,981,515 | B2 | 7/2011 | Ambrose et al. | |
| 8,092,876 | B2 | 1/2012 | O'Brien et al. | |
| 8,133,557 | B2 | 3/2012 | Parekh et al. | |
| 8,163,850 | B2 | 4/2012 | Marsh et al. | |
| 8,168,276 | B2 | 5/2012 | Cleaver et al. | |
| 8,193,275 | B2 | 6/2012 | Moncla et al. | |
| 8,367,171 | B2 | 2/2013 | Stenson et al. | |
| 8,574,672 | B2 | 11/2013 | Doreau et al. | |
| 8,722,787 | B2 | 5/2014 | Romick et al. | |
| 8,779,053 | B2 | 7/2014 | Lundgard et al. | |
| 8,791,204 | B2 | 7/2014 | Choudhery | |
| 8,946,329 | B2 | 2/2015 | Wilbur et al. | |
| 8,998,398 | B2 | 4/2015 | Hoogmartens | |
| 9,000,074 | B2 | 4/2015 | Choudhery | |
| 9,011,999 | B2 | 4/2015 | Cavallin et al. | |
| 9,096,772 | B2 | 8/2015 | Lespinasse et al. | |
| 9,115,241 | B2 | 8/2015 | Gao et al. | |
| 9,138,985 | B1 | 9/2015 | Yang et al. | |
| 9,181,448 | B2 | 11/2015 | Li et al. | |
| 9,187,213 | B2 | 11/2015 | Prouvost et al. | |
| 9,206,332 | B2 | 12/2015 | Cavallin et al. | |
| 9,321,935 | B2 | 4/2016 | Seneker et al. | |
| 9,376,582 | B1 | 6/2016 | Dannhauser et al. | |
| 9,394,456 | B2 | 7/2016 | Rademacher et al. | |
| 9,409,219 | B2 | 8/2016 | Niederst et al. | |
| 9,409,433 | B2 | 8/2016 | Carreras | |
| 9,428,663 | B2 | 8/2016 | Song et al. | |
| 9,446,604 | B2 | 9/2016 | Sarkisian et al. | |
| 9,487,619 | B2 | 11/2016 | Kuo et al. | |
| 9,598,602 | B2 | 3/2017 | Kuo et al. | |
| 9,650,176 | B2 | 5/2017 | Cavallin et al. | |
| 9,650,539 | B2 | 5/2017 | Kuo et al. | |
| 9,695,264 | B2 | 7/2017 | Lock et al. | |
| 9,708,504 | B2 | 7/2017 | Singer et al. | |
| 9,828,522 | B2 | 11/2017 | Argyropoulos et al. | |
| 9,920,217 | B2 | 3/2018 | Skillman et al. | |
| 9,962,924 | B2 | 5/2018 | Carreras | |
| 9,976,055 | B2 * | 5/2018 | Hsieh | C09D 175/04 |
| 10,045,938 | B2 | 8/2018 | Doshi et al. | |
| 10,066,113 | B2 | 9/2018 | Loccufier et al. | |
| 10,071,563 | B2 | 9/2018 | Pervan | |
| 10,131,796 | B2 | 11/2018 | Martinoni et al. | |
| 10,328,680 | B2 | 6/2019 | Pervan | |
| 10,792,910 | B2 | 10/2020 | Ziegenbalg et al. | |
| 10,875,076 | B2 | 12/2020 | Scott | |
| 11,453,802 | B2 | 9/2022 | Moore et al. | |
| 2002/0155235 | A1 | 10/2002 | Taylor et al. | |
| 2005/0156991 | A1 | 7/2005 | Renn | |
| 2008/0062381 | A1 | 3/2008 | Doshi et al. | |
| 2013/0202858 | A1 | 8/2013 | Shimohara | |
| 2013/0206756 | A1 | 8/2013 | Niederst et al. | |
| 2013/0280455 | A1 | 10/2013 | Evans et al. | |
| 2013/0316109 | A1 | 11/2013 | Niederst et al. | |
| 2014/0319133 | A1 | 10/2014 | Castelberg et al. | |
| 2015/0021323 | A1 | 1/2015 | Niederst et al. | |
| 2015/0218426 | A1 | 8/2015 | Clay et al. | |
| 2015/0344732 | A1 | 12/2015 | Witt-Sanson et al. | |
| 2016/0009941 | A1 | 1/2016 | Rademacher | |
| 2016/0024325 | A1 | 1/2016 | Li | |
| 2016/0160075 | A1 | 6/2016 | Seneker et al. | |
| 2016/0297994 | A1 | 10/2016 | Kuo et al. | |
| 2016/0376446 | A1 | 12/2016 | Gibanel et al. | |
| 2017/0002227 | A1 | 1/2017 | Gibanel et al. | |
| 2017/0204289 | A1 | 7/2017 | Kurtz et al. | |
| 2018/0265729 | A1 | 9/2018 | Gibanel et al. | |
| 2019/0112100 | A1 | 4/2019 | Scott | |
| 2019/0168259 | A1 * | 6/2019 | Zhou | B65D 85/72 |
| 2019/0211158 | A1 * | 7/2019 | Swaans | C08G 18/0823 |
| 2019/0338144 | A1 | 11/2019 | Gibanel et al. | |
| 2020/0115580 | A1 | 4/2020 | Moriyama et al. | |
| 2020/0207516 | A1 | 7/2020 | Seneker et al. | |
| 2020/0291261 | A1 | 9/2020 | Moore et al. | |
| 2020/0347252 | A1 * | 11/2020 | Sasada | C09D 11/102 |
| 2020/0385601 | A1 | 12/2020 | Gibanel et al. | |
| 2021/0031221 | A1 | 2/2021 | Mace | |
| 2021/0032494 | A1 | 2/2021 | Moore et al. | |
| 2022/0017762 | A1 | 1/2022 | Sasada et al. | |
| 2022/0161586 | A1 | 5/2022 | Koerner | |
| 2022/0332134 | A1 | 10/2022 | Wolfe et al. | |
| 2024/0287316 | A1 | 8/2024 | Skillman et al. | |

FOREIGN PATENT DOCUMENTS

| | | | |
|---|---|---|---|
| JP | 2011/213364 | A | 10/2011 |
| WO | WO 2014/078618 | A1 | 5/2014 |
| WO | WO 2014/140057 | A1 | 9/2014 |
| WO | WO 2015/057932 | A1 | 4/2015 |
| WO | WO 2015/160788 | A1 | 4/2015 |
| WO | WO 2015/164703 | A1 | 10/2015 |
| WO | WO 2015/179064 | A1 | 10/2015 |
| WO | WO 2016/196174 | A1 | 12/2016 |
| WO | WO 2016/196190 | A1 | 12/2016 |
| WO | WO 2017/112837 | A1 | 6/2017 |
| WO | WO 2017/180895 | A1 | 10/2017 |
| WO | WO 2018/013766 | A1 | 1/2018 |
| WO | WO 2018/075762 | A1 | 4/2018 |
| WO | WO 2018/085052 | A1 | 5/2018 |
| WO | WO 2018/125895 | A1 | 7/2018 |
| WO | WO 2019/046700 | A1 | 3/2019 |
| WO | WO 2019/046750 | A1 | 3/2019 |
| WO | WO 2019/060403 | A1 | 3/2019 |
| WO | WO 2019/078925 | A1 | 4/2019 |
| WO | WO 2020/202774 | A1 | 10/2020 |
| WO | WO 2021/105970 | A1 | 6/2021 |
| WO | WO 2022/246124 | A1 | 11/2022 |

OTHER PUBLICATIONS

ASTM D870-15, "Standard Practice for Testing Water Resistance of Coatings Using Water Immersion," ASTM Int'l, West Conshohocken, PA, 2020; 3 pgs.
ASTM D1238-13, "Standard Test Method for Melt Flow Rates of Thermoplastics by Extrusion Plastometer," 1965, this edition published Aug. 2013, ASTM Int'l, West Conshohocken, PA, 16 pages.
ASTM D1331, "Standard Test Methods for Surface and Interfacial Tension of Solutions of Paints, Solvents, Solutions of Surface-Active Agents, and Related materials," Method C, ASTM Int'l, West Conshohocken, PA, 2020;6 pgs.
ASTM D3359-17, "Standard Test Method for Rating Adhesion by Tape Test," Test Method B, current edition published Mar. 2017, ASTM Int'l, West Conshohocken, PA, 9 pages.

(56) References Cited

OTHER PUBLICATIONS

ASTM D3363-20, "Standard Test Method for Film Hardness by Pencil Test," 1974, this edition published Sep. 2020, ASTM Int'l, West Conshohocken, PA, 3 pages.

ASTM D3363-22, "Standard Test Method for Film Hardness by Pencil Test," Reapproved published Jul. 2022, ASTM Int'l, West Conshohocken, PA, 2 pages.

ASTM D3418-15, "Standard Test Method for Transition Temperatures and Enthalpies of Fusion and Crystallization of Polymers by Differential Scanning Calorimetry," 1975, this edition published Jun. 2015, ASTM Int'l, West Conshohocken, PA, 7 pages.

ASTM D4145-10 (Reapproved 2018), "Standard Test Method for Coating Flexibility of Prepainted Sheet," 1983, last previous edition approved 2010, reapproved published Sep. 2018, ASTM Int'l, West Conshohocken, PA, 4 pages.

ASTM D5768-02 (Reapproved 2006), "Standard Test Method for Determination of Iodine Value of Tall Oil Fatty Acids," 1995, previous edition 2002, reapproved edition published Nov. 2006, ASTM Int'l, West Conshohocken, PA, 3 pages.

ASTM DD2248-25A "Standard Practice for Detergent Resistance of Organic Finishes," ASTM Int'l, West Conshohocken, PA; 2025;5 pgs.

ASTM G85 Annex 5, "Standard practice for Modified Salt Spray (Fog) Testing," ASTM Int'l, West Conshohocken, PA, 2019; 14 pgs.

Cheng et al., "Thermal analysis of poly(butylene terephthalate) for heat capacity, rigid-amorphous content, and transition behavior," 1988, *Macromolecular Chemistry and Physics*, 189(10):2443-2458.

Cummins et al., "Inkjet printing of conductive material: A review", Nov. 16, 2012, *Circuit World*, 38(4):193-213. Available online at www.emeraldinsight.com/0305-6120.htm.

Daly et al., "Inkjet printing for pharmaceutics—A review of research and manufacturing," *Intl. J. Pharm.*, 2015, 494:554-567. Available online Mar. 12, 2015.

Derby et al., "Inkjet Printing of Highly Loaded Particulate Suspensions," Nov. 2003, *MRS Bulletin*, pp. 815-818. Available online at www.mrs.org/publication/bulletin.

EP Extended Search Report for EP 22805524.0, issued by the European Patent Office on May 13, 2025; 20 pgs.

Food and Drug Administration (FDA) "Preparation of Premarket Submission for Food Contact Substances: Chemistry Recommendations," Dec. 2007, Downloaded from the Internet Sep. 4, 2025; 25 pgs.

Guo et al., "Inkjet and inkjet-based 3D printing: Connecting fluid properties and printing performance," 2017, *Rapid Prototyping Journal*, 23(3):562-576. Available online at www.emeraldinsight.com/1355-2546.htm.

Hong et al., "Aerosol Jet Printed p- and n-type Electrolyte-Gated Transistors with a Variety of Electrode Materials: Exploring Practical Routes to Printed Electronics," Oct. 17, 2014, *ACS Appl. Mater. Interfaces*, 6(21):18704-18711.

International Patent Application No. PCT/US2022/030124, filed May 19, 2022; International Preliminary Report on Patentability issued Nov. 21, 2023; 5 pages.

International Patent Application No. PCT/US2022/030124, filed May 19, 2022; International Search Report / Written Opinion issued Aug. 9, 2022; 6 pages.

International Patent Application No. PCT/US2022/030130, filed May 19, 2022; International Preliminary Report on Patentability issued Nov. 21, 2023; 6 pages.

International Patent Application No. PCT/US2022/030130, filed May 19, 2022; International Search Report / Written Opinion issued Aug. 30, 2022; 7 pages.

Ragelis, "Extraction Test Method for Flexible Barrier Methods," Apr. 1, 1964, *Journal of the Association of Analytical Chemists*, 47(2):386-388.

Secor, "Principles of Aerosol Jet Printing," SAND2018-6957J, Sandia National Laboratories, Albuquerque, NM, U.S. Department of Energy's National Nuclear Security Administration contract DE-NA0003525, 31 pages. No date available, believed to be available as early as 2018.

Seifert et al., "Additive Manufacturing Technologies Compared: Morphology of Deposits of Silver Ink Using Inkjet and Aerosol Jet Printing," Jan. 8, 2015, *Ind. Eng. Chem. Res.*, 54:769-779.

Wilkinson et al., "A review of aerosol jet printing—a non-traditional hybrid process for micro-manufacturing," 2019, *Int. J. Adv. Manuf Technol.*, 105:4599-4619. Published online May 9, 2019.

* cited by examiner

LIQUID OR AEROSOL JET COATING COMPOSITIONS FOR SUBSTRATES, COATED SUBSTRATES AND METHODS OF COATING

CROSS-REFERENCE TO RELATED APPLICATIONS

The present application is the § 371 U.S. National Stage of International Application No. PCT/US2022/030130, filed 19 May 2022, which claims priority to U.S. Provisional Application Ser. No. 63/190,763, filed on May 19, 2021, which are incorporated herein by reference.

BACKGROUND

Coil and extrusion coatings are frequently used to coat substrates in an economical manner. Such coatings are known to have a number of useful properties such as abrasion resistance, flexibility, durability, corrosion resistance, weather resistance, resistance to cracking and the like.

Coil and extrusion coatings are used to impart durable, colorful aesthetics in a wide range of applications, including metal building products. Extrusion coatings, also known as spray coatings, are applied by hand or electrostatically to preformed metal components such as curtain walls, store fronts, windows, louvers, and the like, while coil coatings are roll-coated onto planar metal sheets that are postformed into architectural components such as building panels, roofing, siding, and the like.

A wide variety of liquid applied coating compositions have been used to provide hardened coatings on the surfaces of various products, including metal building products for example. The hardened coating should preferably have excellent adhesion to the substrate, resist staining and other coating defects such as "popping," "blushing" and/or "blistering," and resist degradation over long periods of time, even when exposed to harsh environments. In addition, the hardened coating should generally be capable of maintaining suitable film integrity during fabrication and be capable of withstanding the processing conditions to which the substrate may be subjected during use.

Liquid based coatings largely satisfy the needs of the market today, but there are some notable disadvantages associated with their use. Liquid coatings contain large volumes of water and/or organic solvents that contribute to shipping costs. Then as the liquid coating composition is applied, a significant amount of energy must be expended, often in the form of burning fossil fuels, to remove the water or solvent during the coating hardening process. Once organic solvent is driven out of the hardening film, it either contributes to Volatile Organic Content (VOC) generation or it must be mitigated by large, energy-consuming, thermal oxidizers. Additionally, these processes can emit significant volumes of carbon dioxide.

One alternative to conventional liquid coatings is the use of laminate coatings. In this process, a laminated or extruded plastic film is adhered to the metal via a heating step. The product required to produce laminate films is only compatible with a limited number of thermoplastic materials (e.g., the materials must have the tensile strength required to be stretched into thin films). There is also a limit on the extent to which such films can be stretched, restricting how thin the final coating can be applied on the substrate. There can also be a significant capital investment required to retrofit an existing production facility to accept laminated steel or aluminum.

What is needed is an improved coating composition for rigid substrate applications, which overcomes the above disadvantages associated with conventional liquid, powder, and laminate packaging coating compositions.

SUMMARY

The present disclosure provides liquid jet or aerosol jet coating compositions, particularly coil substrate coating compositions, coated coil substrates, articles including or made from such coated coil substrates, and methods of coating a coil substrate, and methods of making an article, or a portion thereof.

In one embodiment a substrate liquid jet or aerosol jet coating composition is provided that includes: polymer particles comprising a polymer having a number average molecular weight of at least 2000 Daltons, wherein the polymer particles have a particle size distribution having a D50 of less than 10 microns; and a liquid carrier comprising water in a major amount of the liquid carrier. Methods of coating such compositions on coil substrates to form coated coil substrates, as well as coated coil substrates, are also provided.

Herein, "coil coating" compositions refer to coating compositions that are suitable for coating on rigid materials directly, or indirectly on a pre-treatment layer or a primer layer that is not derived from a free-standing film (i.e., a film formed before being applied to another substrate, such as by lamination) overlying a substrate. Thus, by way of example, a coating composition applied either to a paper layer overlying a coil substrate, or to a laminated plastic layer overlying a coil substrate, is not a coil coating composition as used herein.

A "liquid or aerosol jet coating composition" refers to a composition that includes polymer particles in a water-based carrier, thereby forming a water-based polymer dispersion. The particle sizes referred to herein may be determined by laser diffraction particle size analysis for starting materials (e.g., primary polymer particles, charge control agents, lubricants, etc.), using a Beckman Coulter LS 230 Laser Diffraction Particle Size Analyzer or equivalent, calibrated as recommended by the manufacturer.

In this context, the "D-values"—D50, D90, D95, and D99—are the particle sizes which divide a sample's volume into a specified percentage when the particles are arranged on an ascending particle size basis. For example, for particle size distributions the median is called the D50 (or ×50 when following certain ISO guidelines). The D50 is the particle size in microns that splits the distribution with half above and half below this diameter. The Dv50 (or Dv0.5) is the median for a volume distribution. The D90 describes the particle size where ninety percent of the distribution has a smaller particle size and ten percent has a larger particle size. The D95 describes the particle size where ninety five percent of the distribution has a smaller particle size and five percent has a larger particle size. The D99 describes the particle size where ninety nine percent of the distribution has a smaller particle size and one percent has a larger particle size. Unless specified otherwise herein, D50, D90, D95, and D99 refer to Dv50, Dv90, Dv95, and Dv99, respectively. The D-values specified herein may be determined by laser diffraction particle size analysis.

A "hardened" coating refers to one wherein particles are covalently cured via a crosslinking reaction (e.g., a thermoset coating) or simply fused and/or coalesced into a layer in the absence of a crosslinking reaction (e.g., a thermoplastic coating), and adhered to a coil substrate, thereby forming a coated coil substrate. The term “hardened” does not imply anything related to the relative hardness or softness (Tg) of a coating.

An “adherent” coating refers to a hardened coating that adheres (i.e., bonds) to a substrate, such as a coil substrate (e.g., a metal coil), preferably according to the Adhesion Test described in the Test Methods. Preferably, an adhesion rating of 9 or 10, preferably 10, is considered to be adherent.

A “continuous” coating refers to a hardened coating that is free of coating defects (preferably, free of pinholes) that result in exposed substrate (i.e., regions of the substrate exposed through the hardened coating). A continuous coating may be an all-over coating, completely covering the substrate, or it may only cover parts of the substrate, e.g., as in a patterned coating.

A “patterned” coating (i.e., a multi-portion coating) refers to a hardened coating printed in two or more regions on a substrate surface, which may or may not have “blank” regions between and/or surrounding the printed (i.e., coated) regions, wherein “blank” regions have no coating thereon. A “patterned” coating refers to any coating having one or more of the following: (i) two or more hardened coating portions of a same chemical composition, which are not directly contiguous, disposed on different regions of a same substrate surface and present in a same overall multi-portion coating; (ii) two or more hardened coating portions of different chemical compositions (e.g., having different color, gloss level, etc.) disposed on different regions of a same substrate surface and present in a same overall multi-portion coating; or (iii) two or more hardened coating portions of a same chemical composition of different thicknesses or textures, which may or may not be directly contiguous, disposed on different regions of a same substrate surface and present in a same overall multi-portion coating. A patterned coating is distinct from an all-over coating. This definition of a patterned coating also excludes: (a) a substrate coated at only the edges; (b) a substrate coated everywhere but the edge; and (c) a coating that does not exhibit any of (i), (ii), or (iii). The patterned coating may include a regular or irregular pattern of coated regions, which may be in a variety of shapes (e.g., stripes, diamonds, squares, circles, ovals). The terms “pattern” and “patterned” does not require any repetition in design elements, although such repetition may be present. The coated regions of the patterned coating are preferably “continuous” as defined above, in that they are free of pinholes and other coating defects that result in exposed substrate if an underlying coating is not present.

The term “substantially free” of a particular component means that the compositions or hardened coatings of the present disclosure contain less than 1,000 parts per million (ppm) of the recited component, if any. The term “essentially free” of a particular component means that the compositions or hardened coatings of the present disclosure contain less than 100 parts per million (ppm) of the recited component, if any. The term “essentially completely free” of a particular component means that the compositions or hardened coatings of the present disclosure contain less than 10 parts per million (ppm) of the recited component, if any. The term “completely free” of a particular component means that the compositions or hardened coatings of the present disclosure contain less than 20 parts per billion (ppb) of the recited component, if any. The preceding terms of this paragraph when used with respect to a composition or hardened coating that may contain a recited component, if any, means that the composition or hardened coating contains less than the pertinent ppm or ppb maximum threshold for the component regardless of the context of the component in the composition or hardened coating (e.g., regardless of whether the compound is present in unreacted form, in reacted form as a structural unit of another material, or a combination thereof).

The term “bisphenol” refers to a polyhydric polyphenol having two phenylene groups that each include six-carbon rings and a hydroxyl group attached to a carbon atom of the ring, wherein the rings of the two phenylene groups do not share any atoms in common. By way of example, hydroquinone, resorcinol, catechol, and the like are not bisphenols because these phenol compounds only include one phenylene ring.

The term “on,” when used in the context of a coating applied on a surface or substrate, includes both coatings applied directly (e.g., virgin metal or pre-treated metal such as electroplated steel) or indirectly (e.g., on a primer layer) to the surface or substrate. Thus, for example, a coating applied to a pre-treatment layer (e.g., formed from a chrome or chrome-free pretreatment) or a primer layer overlying a substrate constitutes a coating applied on (or disposed on) the substrate.

The terms “polymer” and “polymeric material” include, but are not limited to, organic homopolymers, copolymers, such as for example, block, graft, random and alternating copolymers, terpolymers, etc., and blends and modifications thereof. Furthermore, unless otherwise specifically limited, the term “polymer” shall include all possible geometrical configurations of the material. These configurations include, but are not limited to, isotactic, syndiotactic, and atactic symmetries.

The term “aryl group” (e.g., an arylene group) refers to a closed aromatic ring or ring system such as phenylene, naphthylene, biphenylene, fluorenylene, and indenyl, as well as heteroarylene groups (e.g., a closed aromatic or aromatic-like ring hydrocarbon or ring system in which one or more of the atoms in the ring is an element other than carbon (e.g., nitrogen, oxygen, sulfur, etc.)). Suitable heteroaryl groups include furyl, thienyl, pyridyl, quinolinyl, isoquinolinyl, indolyl, isoindolyl, triazolyl, pyrrolyl, tetrazolyl, imidazolyl, pyrazolyl, oxazolyl, thiazolyl, benzofuranyl, benzothiophenyl, carbazolyl, benzoxazolyl, pyrimidinyl, benzimidazolyl, quinoxalinyl, benzothiazolyl, naphthyridinyl, isoxazolyl, isothiazolyl, purinyl, quinazolinyl, pyrazinyl, 1-oxidopyridyl, pyridazinyl, triazinyl, tetrazinyl, oxadiazolyl, thiadiazolyl, and so on. When such groups are divalent, they are typically referred to as “arylene” or “heteroarylene” groups (e.g., furylene, pyridylene, etc.).

The term “phenylene” as used herein refers to a six-carbon atom aryl ring (e.g., as in a benzene group) that can have any substituent groups (including, e.g., halogens (which are not preferred), hydrocarbon groups, oxygen atoms, hydroxyl groups, etc.). Thus, for example, the following aryl groups are each phenylene rings: $-C_6H_4-$, $-C_6H_3(CH_3)-$, and $-C_6H(CH_3)_2Cl-$. In addition, for example, each of the aryl rings of a naphthalene group are phenylene rings.

The term “multiple” or “multi” means two or more of the referenced item (e.g., material, component, composition, coating portion).

In the context of liquid or aerosol jet coating compositions, “different” means that the liquid or aerosol coating compositions are different (i.e., dissimilar) in one or more chemical/physical ways (e.g., monomer types/amounts, molecular weight of polymer particles, color of coating composition, additive types/amounts) thereby providing one or more different functions (e.g., hardness, flexibility, corrosion resistance, aesthetic, tactile).

Herein, the term "comprises" and variations thereof do not have a limiting meaning where these terms appear in the description and embodiments. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof).

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.) and any sub-ranges (e.g., 1 to 5 includes 1 to 4, 1 to 3, 2 to 4, etc.).

As used herein, the term "room temperature" refers to a temperature of 20° C. to 25° C.

The term "in the range" or "within a range" (and similar statements) includes the endpoints of the stated range.

Reference throughout this specification to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above summary of the present disclosure is not intended to describe each disclosed embodiment or every implementation of the present disclosure. The description and drawings that follow more particularly exemplify illustrative embodiments. In several places throughout the application, guidance is provided through lists of examples, which examples may be used in various combinations. In each instance, the recited list serves only as a representative group and should not be interpreted as an exclusive list. Thus, the scope of the present disclosure should not be limited to the specific illustrative structures described herein, but rather extends at least to the structures described by the language of the embodiments, and the equivalents of those structures. Any of the elements that are positively recited in this specification as alternatives may be explicitly included in the embodiments or excluded from the embodiments, in any combination as desired. Although various theories and possible mechanisms may have been discussed herein, in no event should such discussions serve to limit the claimable subject matter.

DETAILED DESCRIPTION OF ILLUSTRATIVE EMBODIMENTS

Figure 1:
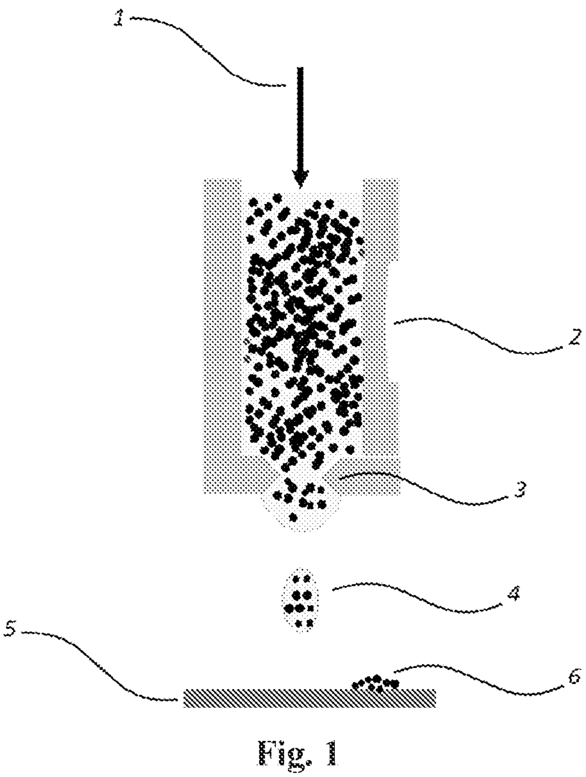
FIG. 1 is a schematic of an exemplary liquid jet application system.

The present disclosure provides liquid jet or aerosol jet coating compositions (i.e., coating compositions), particularly substrate liquid jet or aerosol jet coating compositions, coated substrates, methods—e.g., method of making a substrate liquid jet or aerosol jet coating composition, method of coating a substrate, and method of making substrates—as well as articles including such substrates.

Examples of materials that may be coated herein can include, for example coil substrates, and more specifically metal coils. Any metal may be used, such as aluminum, iron, copper, tin, steel, and the like, an alloy thereof, a combination thereof. Aluminum and steel are preferred, with aluminum particularly preferred. In some preferred embodiments, substrates can include hot dipped galvanized metals, for example.

Coil-coated metals are high performance materials used in a wide variety of applications including, for example, metal building panels, metal roofs, wall panels, garage doors, office furniture, home appliances, heating and cooling panels, automotive panels and parts, and the like. In some preferred aspects, the coated substrates may be used in curtain walls, windows, doors, panels, skylights, atrium systems, louvers, grilles, column covers and any sort of metal building components.

In an embodiment, the present description provides a coated article, e.g., a substrate, preferably a coil substrate, with one or more coating compositions applied thereon. In some coil coated articles, a primer composition may be applied to the coil substrate before other coatings are applied. Typically, the substrate is pretreated and then primed with a commercially available anticorrosive coating. Various pretreatments and primers are known to those of skill in the art and may vary depending on the type of coating and the ultimate end use of the coating.

In some embodiments, a primer coating may be applied to the substrate before other coatings are applied. Typically, the substrate is pretreated and then primed with a commercially available anticorrosive coating. Various pretreatments and primers are known to those of skill in the art and may vary depending on the type of coating (e.g., coil coatings or spray coatings) and the ultimate end use of the coating. The primer coating, if utilized, has thickness of preferably about 1 to 15 micrometers, more preferably 5 to 12 micrometers.

Accordingly, preferably, the substrate liquid jet or aerosol jet coating compositions, and preferably, the hardened coatings, of the present disclosure are substantially free of each of bisphenol A, bisphenol F, and bisphenol S; the liquid jet or aerosol jet coating compositions, and preferably, the hardened coatings, of the present disclosure are essentially free of each of bisphenol A, bisphenol F, and bisphenol S; the liquid jet or aerosol jet coating compositions, and preferably, the hardened coatings, of the present disclosure are essentially completely free of each of bisphenol A, bisphenol F, and bisphenol S; or the liquid jet or aerosol jet coating compositions, and preferably, the hardened coatings, of the present disclosure are completely free of each of bisphenol A, bisphenol F, and bisphenol S.

More preferably, the liquid jet or aerosol jet coating compositions, and preferably the hardened coatings, of the present disclosure are substantially free of all bisphenol compounds; the liquid jet or aerosol jet coating compositions, and preferably the hardened coatings, of the present disclosure are essentially free of all bisphenol compounds; the liquid jet or aerosol jet coating compositions, and preferably the hardened coatings, of the present disclosure are essentially completely free of all bisphenol compounds; or the liquid jet or aerosol jet coating compositions, and preferably the hardened coatings, of the present disclosure are completely free of all bisphenol compounds.

Preferably, tetramethyl bisphenol F (TMBPF) is not excluded from the liquid jet or aerosol jet coating compositions or hardened coatings of the present disclosure. TMBPF is 4-[(4-hydroxy-3,5-dimethylphenyl)methyl]-2,6-dimethylphenol, shown below, made by the following reaction:

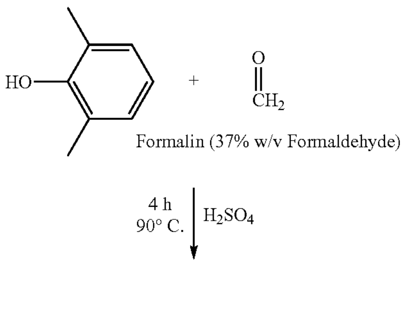

-continued

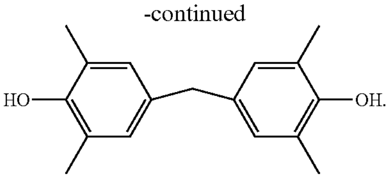

For example, a liquid jet or aerosol jet coating composition is not substantially free of bisphenol A that includes 600 ppm of bisphenol A and 600 ppm of the diglycidyl ether of bisphenol A (BADGE)—regardless of whether the bisphenol A and BADGE are present in the composition in reacted or unreacted forms, or a combination thereof.

The amount of bisphenol compounds (e.g., bisphenol A, bisphenol F, and bisphenol S) can be determined based on starting ingredients; a test method is not necessary and parts per million (ppm) can be used in place of weight percentages for convenience in view of the small amounts of these compounds.

Although, with the notable exception of TMBPF, the intentional addition of many bisphenol compounds is now generally undesirable due to shifting consumer perceptions, it should be understood that non-intentional, trace amounts of bisphenols, may potentially be present in compositions or coatings of the present disclosure due to, e.g., environmental contamination. Although the balance of scientific evidence available to date indicates that the small trace amounts of bisphenol compounds, such as bisphenol A, that might be released from existing coatings does not pose any health risks to humans, these compounds are nevertheless perceived by some people as being potentially harmful to human health. Consequently, there is a desire by some to eliminate these compounds from coatings on food-contact surfaces.

Also, it is desirable to avoid the use of components that are unsuitable for such surfaces due to factors such as taste, toxicity, or other government regulatory requirements.

For example, in preferred embodiments, the liquid jet or aerosol jet coating composition is "PVC-free." That is, the liquid jet or aerosol jet coating composition preferably contains, if any, less than 2% by weight of vinyl chloride materials and other halogenated vinyl materials, more preferably less than 0.5% by weight of vinyl chloride materials and other halogenated vinyl materials, and even more preferably less than 1 ppm of vinyl chloride materials and other halogenated vinyl materials, if any.

As a general guide to minimize potential, e.g., toxicity concerns, a hardened coating formed from the liquid jet or aerosol jet coating composition preferably includes, if it includes any detectable amount, less than 50 ppm, less than 25 ppm, less than 10 ppm, or less than 1 ppm, extractables, when tested pursuant to the Global Extraction Test described in the Test Methods. An example of these testing conditions is exposure of the hardened coating to 10 wt-% ethanol solution for two hours at 121° C., followed by exposure for 10 days in the solution at 40° C.

Such reduced global extraction values may be obtained by limiting the amount of mobile or potentially mobile species in the hardened coating. In this context, "mobile" refers to material that may be extracted from a cured coating according to the Global Extraction Test of the Test Methods. This can be accomplished, for example, by using pure, rather than impure reactants, avoiding the use of hydrolyzable components or bonds, avoiding or limiting the use of low molecular weight additives that may not efficiently react into the coating, and using optimized cure conditions optionally in combination with one or more cure additives. This makes the hardened coatings formed from the liquid jet or aerosol jet coating compositions described herein particularly desirable for use on food-contact surfaces.

Liquid Jet or Aerosol Jet Coating Composition

According to the present disclosure, a liquid jet or aerosol jet coating composition is provided. Such a coating composition refers to a composition that includes polymer particles in a water-based carrier, thereby forming a water-based polymer dispersion. Herein, a "liquid jet or aerosol jet coating composition" is used interchangeably with "liquid or aerosol jet coating composition," "liquid or aerosol coating composition," "coating composition," and "water-based polymer dispersion."

Such compositions can form a hardened adherent coating on a substrate, such as a substrate. In particular, such compositions may also be useful for coating substrates, or portions thereof.

Water-Based Polymer Dispersions

A water-based dispersion that forms a "liquid or aerosol jet coating composition" includes polymer particles in a water-based carrier. The water-based carrier includes water as the main (i.e., major) liquid carrier. By this it is meant that the liquid carrier includes at least 51 wt-% water. Although, preferably, no organic solvents or other organic liquids are included in the liquid carrier, in certain embodiments less than 50 wt-% (e.g., ≤49 wt-%) of the liquid carrier is an organic liquid. Preferably, less than 25 wt-%, more preferably less than 10 wt-%, and even more preferably less than 1 wt-%, of the liquid carrier includes an organic solvent (e.g., an organic solvent such as ethanol).

The liquid or aerosol jet coating composition is preferably storage stable for at least 2 months, at least 3 months, at least 4 months, at least 5 months, or at least 6 months, at ambient temperate without any phase separation as determined by the unaided human eye.

The solids content of the coating composition is preferably at least 10 wt-%, at least 15 wt-%, or at least 20 wt-%, based on the total weight of the coating composition (prior to incorporating into a liquid jet or aerosol jet coating system).

The solids content of the coating composition is preferably up to 50 wt-%, up to 40 wt-%, or up to 30 wt-%, based on the total weight of the coating composition (prior to incorporating into a liquid jet or aerosol jet coating system).

The amount of polymer particles in the water-based carrier (i.e., concentration of polymer particles in the coating composition) is preferably at least 30 wt-%, at least 50 wt-%, or at least 70 wt-%, based on the total solids content of the coating composition (i.e., the total weight of the cured coating).

The amount of polymer particles in the water-based carrier (i.e., concentration of polymer particles in the coating composition) is preferably up to 99 wt-%, up to 97 wt-%, or up to 95 wt-%, based on the total solids content of the coating composition (i.e., the total weight of the cured coating).

The preferred viscosity range of the liquid jet or aerosol jet coating composition (i.e., water-based dispersion before being subjected to a liquid or aerosol jetting process) may vary for liquid jet application versus aerosol jet application. Viscosity can be measured via a Brookfield viscometer in accordance with ASTM 2196 (2020), Method A. Unless otherwise specified, the viscosity of samples intended for liquid jetting should be measured at 120° F. (49° C.) and the samples for aerosol jetting should be measured at 80° F. (27° C.).

The viscosity of the coating composition for a liquid jet application process is preferably at least 1 centipoise (cps), at least 10 cps, or at least 20 cps. The viscosity of the coating composition for a liquid jet application process is preferably up to 50 centipoise (cps), up to 40 cps, or up to 30 cps.

The viscosity of the coating composition for an aerosol jet application process is preferably at least 1 centipoise (cps), at least 50 cps, or at least 100 cps. The viscosity of the coating composition for an aerosol jet application process is preferably up to 1,000 centipoise (cps), up to 500 cps, or up to 200 cps.

The preferred surface tension range of the liquid jet or aerosol jet coating composition (i.e., water-based dispersion before being subjected to a liquid or aerosol jetting process) may vary for liquid jet application versus aerosol jet application. Surface tension can be measured in accordance with ASTM D1331 (2020), Method C. Unless otherwise specified, the surface tension of samples intended for liquid jetting or aerosol jetting should be measured at 77° F. (25°).

The surface tension of the coating composition for a liquid jet application process is preferably at least 10 milliNewtons per meter (mN/m), at least 20 mN/m, or at least 30 mN/m.

The surface tension of the coating composition for a liquid jet application process is preferably up to 50 mN/m, up to 45 mN/m, or up to 40 mN/m.

The surface tension of the coating composition for an aerosol jet application process is preferably at least 10 milliNewtons per meter (mN/m), at least 20 mN/m, or at least 30 mN/m. The surface tension of the coating composition for an aerosol jet application process is preferably up to 50 mN/m, up to 45 mN/m, or up to 40 mN/m.

The molecular weight of the polymer in the polymer particles in the liquid jet or aerosol jet coating composition may be described by a few key metrics given that a typical polymer covers a range of molecular weights. Number average molecular weight (Mn) is determined by dividing the total weight of a sample by the total number of molecules in that sample. Weight average molecular weight (Mw) is determined by calculating the sum of each distinct molecular weight in the sample multiplied by the weight fraction of the sample at that molecular weight. Polydispersity index (Mw/Mn) is used to express how broad the molecular weight range is of the sample. The higher the polydispersity index, the broader the molecular weight range. The Mn, Mw, and Mw/Mn can all be determined by Gel Permeation Chromatography (GPC), measured against a set of polystyrene standards of varying molecular weights.

The Mn of the polymer particles of the water-based dispersions is at least 2,000 Daltons, preferably at least 3,000 Daltons, and more preferably at least 4,000 Daltons. The Mn of the polymer particles of the water-based dispersions may be in the millions (e.g., 10,000,000 Daltons), such as can occur with emulsion polymerized acrylic polymers or certain other emulsion polymerized latex polymers, although the Mn may be up to 60,000 Daltons, up to 40,000 Daltons, or up to 20,000 Daltons. Preferably, the Mn of the polymer particles of the water-based dispersions is at least 2,000 Daltons and up to 60,000 Daltons, at least 3,000 Daltons and up to 40,000 Daltons, or at least 4,000 Daltons and up to 20,000 Daltons.

The polymer particles of the water-based dispersions may be made from a polymer having a polydispersity index of less than 4, less than 3, less than 2, or less than 1.5. It may be advantageous, however, for the polymer to have a polydispersity index outside the preceding ranges. For example, without intending to be bound by theory, it may be desirable to have a higher polydispersity index to achieve the benefits of both higher molecular weight (e.g., for flexibility and other mechanic properties) and lower molecular weight (e.g., for flow and leveling) in the same material.

The polymer particles of the water-based dispersion preferably have a particle size distribution with a D50 (preferably, a D90, D95, or a D99) of less than 10 microns, less than 5 microns, or less than 0.5 micron. The polymer particles of the water-based dispersion preferably have a particle size distribution with a D50 (preferably, a D90, D95, or a D99) of at least 0.01 micron, at least 0.05 micron, or at least 0.1 micron. While the most preferred D50 range (less than 0.5 micron) offers the best balance of dispersion stability and jettability, larger D50 samples (0.5 micron or more, or 5 microns or more, or even 10 microns or more), which may exhibit some settling, can still be used if the dispersion is stirred prior to and/or during jetting.

A useful method for determining particle sizes of the polymer particles in the water-based dispersions and other starting materials (e.g., lubricants, etc.) is laser diffraction particle size analysis. An exemplary device for such analysis is a Beckman Coulter LS 230 Laser Diffraction Particle Size Analyzer or equivalent, calibrated as recommended by the manufacturer. It is believed that the particle size analysis of this analyzer embodies the principles of International Standard ISO 13320:2009(E).

Samples for laser diffraction particle size analysis can be prepared, for example, by diluting the samples in a substantially non-swelling solvent (such as cyclohexanone or 2-butoxyethanol) and shaking them until evenly dispersed. The choice of a suitable solvent will depend upon the particular particles to be tested. Solvent screening tests may need to be conducted to identify a suitable substantially non-swelling solvent. By way of example, a solvent in which a polymer particle swells by about 1% or less (as determined by laser diffraction particle size analysis) would be considered a substantially non-swelling solvent.

The polymer particles may include any suitable combination of one or more thermoplastic polymers, one or more thermoset polymers, or a combination thereof. For certain preferred applications, the polymer particles may include any suitable combination of one or more thermoplastic polymers. The term "thermoplastic" refers to a material that melts and changes shape when sufficiently heated and hardens when sufficiently cooled. Such materials are typically capable of undergoing repeated melting and hardening without exhibiting appreciable chemical change. In contrast, a "thermoset" refers to a material that is crosslinked and does not "melt."

The polymer material preferably has a melt flow index greater than 15 grams/10 minutes, greater than 50 grams/10 minutes, or greater than 100 grams/10 minutes. The polymer material preferably has a melt flow index of up to 200 grams/10 minutes, or up to 150 grams/10 minutes. The "melt flow index" referred to herein is measured pursuant to ASTM D1238-13 (2013) at 190° C. and with a 2.16 kilogram weight.

In certain embodiments, the polymer particles are made from semi-crystalline, crystalline polymers, amorphous polymers, or combinations thereof. Suitable semi-crystalline or crystalline polymers may exhibit any suitable percent crystallinity. In some embodiments, the liquid or aerosol coating composition of the disclosure includes at least one semi-crystalline or crystalline polymer having a percent crystallinity (on a weight basis) of at least 5%, at least 10%, or at least 20%. By way of example, the percent crystallinity for a given polymer may be assessed via differential scanning calorimetry (DSC) testing using the following equation:

$$\text{Percent crystallinity (\%)} = [A/B] \times 100$$

wherein: "A" is the heat of fusion of the given polymer (i.e., the total area "under" the melting portion of the DSC curve) in Joules per gram (J/g); and "B" is the heat of fusion in J/g for the 100% crystalline state of the polymer.

For many polymers, a theoretical B value may be available in the scientific literature and such value may be used. For polyester polymers, for example, if such a B value is not available in the literature, then a B value of 145 J/g may be used as an approximation, which is the heat of fusion for 100% crystalline polybutylene terephthalate (PBT) as reported in: Cheng, Stephen; Pan, Robert; and Wunderlich, Bernard; "Thermal analysis of poly(butylene terephthalate) for heat capacity, rigid-amorphous content, and transition behavior," Macromolecular Chemistry and Physics, Volume 189, Issue 10 (1988): 2443-2458.

Preferably, at least one polymer material of the polymer particles (and more preferably substantially all, or all, of the polymer material present in the polymer particles) is at least semi-crystalline (e.g., semi-crystalline or crystalline). The polymer particles may include amorphous polymer material or a blend of at least semi-crystalline polymer material and amorphous polymer material. ASTM-D3418-15 (2015) is an example of a useful methodology for assessing the crystallization properties (crystallization peak temperature) of polymers.

The polymers used may exhibit any suitable glass transition temperature (Tg) or combinations of Tg's. The polymer particles are preferably made from a polymer having a glass transition temperature (Tg) of at least 15° C., at least 20° C., or at least 25° C. and a Tg of up to 150° C., up to 125° C., up to 110° C., up to 100° C., up to 80° C., or up to 50° C.

In some embodiments, lower Tg polymers (e.g., having a Tg lower than 15° C., such as those with a Tg of at least 0° C.) may be used in making the polymer particles used herein as long as the particles include at least one polymer with a higher Tg (e.g., at least 15° C.).

The polymer particles may additionally be of a core-shell morphology (i.e., the outer portion, or shell, of the polymer particle is of a different composition than the inner portion, or core). In such cases, the shell ideally comprises 10% by weight or greater of the total polymer particles, and the Tg preferences above would only apply to the shell of the polymer particle. In other words, the shell of the polymer particle is preferably made from a polymer having a Tg of at least 15° C., at least 20° C., or at least 25° C. and a Tg of up to 150° C., up to 125° C., up to 110° C., up to 100° C., up to 80° C., or up to 50° C.

In embodiments incorporating a crystalline or semi-crystalline polymer, the polymer particles are preferably made from a crystalline or semi-crystalline polymer having a melting point of at least 40° C., and a melting point of up to 130° C.

In preferred embodiments, substantially all (i.e., more than 50 wt-%) of the polymer material of the polymer particles exhibits such a melting point or Tg. Classic amorphous polymers do not, for example, exhibit any discernible melting point (e.g., do not exhibit a DSC melting peak) nor include any crystalline regions. Thus, such classic amorphous polymers would be expected to exhibit a percent crystallinity of 0%. Accordingly, liquid jet and aerosol jet coating compositions of the disclosure may include one or more amorphous polymers having a percent crystallinity of 0% or substantially 0%. If desired, however, liquid jet and aerosol jet coating compositions of the disclosure may include one or more "amorphous" polymers having a percent crystallinity other than 0 (e.g., less than 5%, less than 2%, less than 1%, less than 0.5%, less than 0.1%, etc.).

The one or more polymers of the polymer particles may be aliphatic or aromatic, or a combination of one or more aliphatic polymers and one or more aromatic polymers. Similarly, the one or more polymer may be saturated or unsaturated, or a combination of one or more saturated polymers and one or more unsaturated polymers.

Suitable polymer particles can be prepared from water (e.g., latex polymers) or from organic solvents (e.g., nonane, decane, dodecane, or isohexadecane), or combinations thereof. Water-based polymers are preferred because of cost considerations, to keep VOC levels down during processing, and to keep residual organic solvents out of the liquid or aerosol coating compositions.

The polymer particles may be emulsion, suspension, solution, or dispersion polymerized polymer particles (i.e., particles made from an emulsion, suspension, solution, or dispersion polymerization process). Typically, water-dispersible polymers include self-emulsifiable groups (e.g., carboxylic, sulphonic, phosphonic acid groups, or salts thereof), although this is not a requirement. Neutralizing agents (e.g., amines, ammonia, or ammonium hydroxide), particularly volatile ones, can also be used in making such polymer particles, as is well-known to those skilled in the art. Conversely, if desired, base groups that are neutralized with acids may also be used. Non-ionic polar groups may also alternatively or additional be used.

In embodiments in which acid groups are used to stabilize the polymer particle dispersions, the overall polymer particle may have any suitable acid number so long as the polymer particle is preferably capable of being stably dispersed into water. While not intending to be bound by any theory, it is believed that the presence of at least some acid groups in the polymer particle is desirable, for example, to enhance the liquid stability of the polymer particle dispersion. For examples that use acid-functional self-emulsifiable groups, the total polymer particle has a preferred acid number of at least 5, at least 20, or at least 30 milligrams of KOH per gram of polymer, and a preferred acid number of up to 100, up to 130, or up to 180 milligrams of KOH per gram of polymer. The acid number of the polymer particles can be measured in accordance with BS EN ISO 3682-1998 standard.

The polymer of the polymer particles may be a polyacrylic (i.e., acrylic or acrylate or polyacrylate) (e.g., a solution-polymerized acrylic polymer, an emulsion polymerized acrylic polymer, or combination thereof), polyether, polyolefin, polyester, polyurethane, polycarbonate, polystyrene, or a combination thereof (i.e., copolymer or mixture thereof such as polyether-acrylate copolymer). The polymers may be engineering plastics. Engineering plastics are a group of thermoplastic materials that have better mechanical and/or thermal properties than the more widely used commodity plastics (such as polystyrene, polypropylene, and polyethylene). Examples of engineering plastics include acrylonitrile butadiene styrene (ABS), polycarbonates, and polyamides. Preferably, the polymer of the polymer particles is a polyacrylic (e.g., an acid- or anhydride-functional organic-solution polymerized acrylic polymer, an emulsion polymerized acrylic polymer, or a combination thereof), a polyether, a polyolefin, a polyester, or a combination thereof (e.g., a polyether-acrylate copolymer, a polyester-acrylate copolymer, and the like).

Individual particles may be made of one polymer or two or more polymers. Individual particles may be uniform throughout or have a "core-shell" configuration having 1, 2, 3, or more "shell" layers or have a gradient architecture (e.g., a continuously varying architecture). Such "core-shell" particles may include, for example, multi-stage latexes created via the emulsion polymerization of two or more different stages, emulsion polymerizations conducted using a polymeric surfactant, or combinations thereof. Populations of particles may include mixtures of polymers, including mixtures of uniform and core-shell particles.

The polymer particles may include a polyester polymer. Suitable polyesters include polyesters formed from one or more suitable polycarboxylic acid components (e.g., dicarboxylic acid components, tricarboxylic acid components, tetracarboxylic acid components, etc.) and one or more suitable polyol components (e.g., diol components, triol components, polyols having four hydroxyl groups, etc.). One or more other comonomers may optionally be used, if desired. Dicarboxylic acid components and diol components are preferred.

Suitable dicarboxylic acid components include, for example, aromatic dicarboxylic acids such as terephthalic acid, isophthalic acid, phthalic acid, naphthalenedicarboxylic acid (e.g., 2,6-napthalene dicarboxylic acid), and furandicarboxylic acid (e.g., 2,5-furandicarboxylic acid); aliphatic dicarboxylic acids such as adipic acid, cyclohexane dicarboxylic acid, sebacic acid and azelaic acid; unsaturated acids such as maleic anhydride, itaconic acid, and fumaric acid; and mixtures thereof. Examples of other suitable polycarboxylic acids (or anhydrides) include benzene-pentacarboxylic acid; mellitic acid; 1,3,5,7 napthalene-tetracarboxylic acid; 2,4,6 pyridine-tricarboxylic acid; pyromellitic acid; trimellitic acid; trimesic acid; 3,5,3',5'-biphenyltetracarboxylic acid; 3,5,3',5'-bipyridyltetracarboxylic acid; 3,5,3',5'-benzophenonetetracarboxylic acid; 1,3,6,8-acridinetetracarboxylic acid; 1,2,4,5-benzenetetracarboxylic acid; nadic anhydride; trimellitic anhydride; pyromellitic anhydride, and mixtures thereof. Anhydrides or esters of the aforementioned acids and mixtures of such acids, anhydrides or esters may also be used.

Suitable diol components include, for example, polymethylene glycols represented by the formula $HO—(CH_2)_n—OH$ (where n is about 2 to 10) such as ethylene glycol, propylene glycol, butanediol, hexanediol and decamethylene glycol; branched glycols represented by the formula $HO—CH_2—C(R_2)—CH_2—OH$ (where R is an alkyl group having 1 to 4 carbon atoms) such as neopentyl glycol; diethylene glycol and triethylene glycol; diols having a cyclohexane ring such as cyclohexane dimethanol (CHDM); 2-methyl-1,3 propane diol; diols having a cyclobutane ring such as 2,2,4,4-tetramethyl-1,3-cyclobutanediol; isosorbide; tricyclodecanedimethanol; spirobicyclic diols (e.g., 3,9-bis (1,1-dimethyl-2-hydroxyethyl)-2,4,8,10-tetraoxaspiro[5.5] undecane (PSG)); and mixtures thereof. Glycerol, trimethylol propane (TMP), and other suitable trifunctional or higher polyols may also be used alone or in combination with any other suitable polyol.

The polyester polymer particles are preferably made from semi-crystalline or crystalline polymers. Suitable exemplary crystalline and semi-crystalline polyester polymers include polyethylene terephthalate ("PET"), copolymers of PET such as PET/I, polybutylene terephthalate ("PBT"), polyethylene naphthalate ("PEN"), poly-1,4-cyclohexylenedimethylene terephthalate, and copolymers and combinations thereof. The polyester material may be formed from ingredients including dimer fatty acids. Non-limiting examples of useful commercially available polyester materials may include polyesters commercially available under the tradename DYNAPOL such as, for example, DYNAPOL L912 (includes polycyclic groups derived from tricyclodecanedimethanol), DYNAPOL L952, DYNAPOL P1500, DYNAPOL P1500 HV (has a melting point temperature of about 170° C., a glass transition temperature of about 20° C., and a number average molecular weight of approximately 20,000), DYNAPOL P1510, and DYNAPOL P1550 (each available from Hiils AG and based on monomers including terephthalic acid and/or isophthalic acid); polyester materials commercially available under the TRITAN tradename (available from Eastman Chemical Company and based on monomers including 2,2,4,4-Tetramethyl-1,3-cyclobutanediol); and polyester materials commercially available under the tradename GRILTEX such as, for example, GRILTEX DD2267EG and GRILTEX D2310EG (each available from EMS-Chemie and based on monomers including terephthalic acid and/or isophthalic acid).

Exemplary polyester polymers that may be used in making suitable polymer particles are described, for example, in U.S. Pat. Pub. No. 2014/0319133 (Castelberg et al.), U.S. Pat. Pub. No. 2015/0344732 (Witt-Sanson et al.), U.S. Pat. Pub. No. 2016/0160075 (Seneker et al.), International Application No. PCT/US2018/051726 (Matthieu et al.), U.S. Pat. No. 5,464,884 (Nield et al.), U.S. Pat. No. 6,893,678 (Hirose et al.), U.S. Pat. No. 7,198,849 (Stapperfenne et al.), U.S. Pat. No. 7,803,415 (Kiefer-Liptak et al.), U.S. Pat. No. 7,981,515 (Ambrose et al.), U.S. Pat. No. 8,133,557 (Parekh et al.), U.S. Pat. No. 8,367,171 (Stenson et al.), U.S. Pat. No. 8,574,672 (Doreau et al.), U.S. Pat. No. 9,096,772 (Lespinasse et al.), U.S. Pat. No. 9,011,999 (Cavallin et al.), U.S. Pat. No. 9,115,241 (Gao et al.), U.S. Pat. No. 9,187,213 (Prouvost et al.), U.S. Pat. No. 9,321,935 (Seneker et al.), U.S. Pat. No. 9,650,176 (Cavallin et al.), U.S. Pat. No. 9,695,264 (Lock et al.), U.S. Pat. No. 9,708,504 (Singer et al.), U.S. Pat. No. 9,920,217 (Skillman et al.), U.S. Pat. No. 10,131,796 (Martinoni et al.), U.S. Pat. Pub. No. 2020/0207516 (Seneker et al.), and WO 2021/105970 (Riazzi et al.).

Polyester polymers having C4 rings may be used such as, for example, are present in certain structural segments derived from cyclobutanediol-type compounds such as, e.g., including 2,2,4,4-tetramethyl-1,3-cyclobutanediol). Exemplary such polyesters including such C4 rings are described, for example, in WO2014/078618 (Knotts et al.), U.S. Pat. No. 8,163,850 (Marsh et al.), U.S. Pat. No. 9,650,539 (Kuo et al.), U.S. Pat. No. 9,598,602 (Kuo et al.), U.S. Pat. No. 9,487,619 (Kuo et al.), U.S. Pat. No. 9,828,522 (Argyropoulos et al.), and U.S. Pat. Pub. No. 2020/0207516 (Seneker et al.).

Useful polymers may also include a polyvinylidene fluoride (PVDF) polymer. In many embodiments, the PVDF polymer contains at least 90% by weight, preferably at least 95% by weight, more preferably at least 98% by weight, and most preferably is a homopolymer of repeat vinylidene difluoride units of the formula—$[CH_2CF_2]$—. Generally, PVDF material with greater vinylidene difluoride content may be advantageous. PVDF polymers with such high vinylidene difluoride content may offer advantages over PVDF polymers with lesser vinylidene difluoride content in that the polymers with higher vinylidene difluoride content have the potential to be more economical and more weatherable than compositions based upon fluoroethylene vinyl ether (FEVE).

Optionally, in those embodiments in which the PVDF polymer is not a homopolymer of vinylidene difluoride units, the PVDF polymer may include polymers of one or more additional co-monomers. Monomers that may be copolymerized with vinylidene difluoride often include carbon-carbon double bonds, which may be allylic, styrenic, ethylenic, alpha-methyl styrene groups, (meth)acrylamide groups, cyanate ester groups, vinyl ether groups, (meth) acrylic moieties, or the like. Examples of such monomers may include ethylene, propylene, isobutylene, styrene, vinyl chloride, vinylidene chloride, difluorochloroethylene, chlorotrifluoroethylene tetrafluoroethylene, trifluoropropylene, hexafluoropropylene, vinyl formate, vinyl acetate, vinyl propionate, vinyl butyrate, methyl (meth)acrylate, ethyl (meth)acrylate, (meth)acrylonitrile, N-butoxymethyl (meth) acrylamide, isopropenyl acetate. Others include the monomers listed below for forming vinyl polymers. If thermosetting characteristics are desired, such monomers may include crosslinking functionality such as —OH, —NCO, —COOH, —$NH_2$, combinations of these, and the like. The PVDF polymer may be thermoplastic or thermosetting, although thermoplastic embodiments may be preferred.

The molecular weight (MW) of the PVDF polymer desirably is in the range from about 20,000 to about 500,000, preferably from about 20,000 to 400,000, more preferably 20,000 to 300,000, and most preferably 50,000 to 200,000.

Useful polymers of the present disclosure may also include at least one thermoplastic polymer and/or at least one thermosetting polymer, in which the vinylidene difluoride or other fluoro content of each such polymer is less than about 50% by weight, preferably less than about 20% by weight, more preferably less than about 10% by weight, and even 0% by weight. The thermoplastic and/or thermosetting polymers may provide many benefits. These may help to improve adhesion of the resultant coating to substrates. The use of the thermoplastic and thermosetting polymers may also tend to help improve the hardness and/or durability of the resultant coating. These may also help to reduce costs, in as much as using only a fluorocarbon polymer may tend to be too expensive to be cost effective.

Additionally, using the combination of both a thermoplastic and a thermosetting polymer in addition to the fluorocarbon polymer may provide performance advantages, particularly in preferred embodiments in which both are present but the thermosetting content is limited. It has been found that clarity and gloss performance can suffer when only a thermoplastic or a thermosetting polymer, but not both, are present when coatings are baked at relatively high temperatures and/or for relatively long periods of time. For example, blushing may occur upon boiling water tests if only a thermoplastic polymer is present under such conditions, while blushing may occur upon baking if only a thermosetting polymer is present. Further, blushing may still occur upon baking if too much thermosetting polymer is present, even if used in combination with a thermoplastic polymer. Accordingly, it is generally desirable that the weight ratio of the thermoplastic polymer to the thermosetting polymer is greater than about 2:1, and desirably is in a range from about 2:1 to about 50:1, preferably from about 2:1 to about 10:1. In one particularly preferred embodiment, using a weight ratio of about 4:1 was suitable. Limiting the thermosetting content in this way, and hence the corresponding thermoset content of the resultant coating, reduces and can even greatly avoid the tendency for this kind of blushing to occur.

Each of the thermoplastic and thermosetting polymers may independently have a molecular weight over a wide range. As general guidelines, each independently may have a molecular weight (MW) in the range of from about 5000 to about 200,000 more preferably from about 10,000 to about 150,000. In one embodiment, a suitable thermoplastic vinyl polymer obtained from methyl methacrylate, ethyl acrylate, n-butyl methacrylate and methacrylic acid has a molecular weight of 55,000. In one embodiment, a thermosetting vinyl polymer obtained from methyl methacrylate, ethyl acrylate, and 2-hydroxy acrylate has a molecular weight of 16,200. When both a thermoplastic and a thermosetting polymer are used, the ratio of the molecular weight of the thermoplastic polymer to the molecular weight of the thermosetting polymer may vary over a wide range but generally may be in the range from about 1:4 to about 4:1, more preferably from about 1:2 to about 2:1

A wide variety of polymer materials may be used independently as the thermosetting and/or the thermoplastic polymer. Examples of suitable materials include polyester, polyurethane, vinyl polymers such as poly(meth)acrylic polymers, polycarbonate, polyamide, polyurea, polyimide, polysulfone, polycaprolactone, polysiloxane, combinations of these, and the like. For outdoor use, where weathering resistance is desirable, polyurethanes and vinyl polymers would be more suitable as these tend to be more weather resistant than some other resins. Additionally, it is desirable to limit or avoid aromatic constituents in outdoor applications, as these might have a greater tendency to yellow or degrade over time.

The use of vinyl polymer material for both the thermoplastic and the thermosetting polymers may be desirable in many applications, because the industry has wide experience and trust with the use of this class of materials in combination with PVDF polymers. As used herein, the term "vinyl polymer" refers to a polymer obtained by the addition polymerization of one or more different kinds of monomers, oligomers, and/or polymers via carbon-carbon double bonds. Examples of carbon-carbon double bonds include allylic, styrenic, ethylenic or other olefinic, alpha-methyl styrene groups, (meth)acrylamide groups, cyanate ester groups, vinyl ether groups, (meth)acrylic moieties, and/or the like. The term "(meth)acryl", as used herein, encompasses acryl and/or methacryl. A wide variety of one or more different monomeric, oligomeric and/or polymeric materials having one or more carbon-carbon double bonds may be used to form vinyl thermosetting or thermoplastic resins useful in the practice of the present disclosure. Such monomers, oligomers, and/or polymers are advantageously used to form the copolymer in that so many different types are commercially available and may be selected with a wide variety of desired characteristics that help provide one or more desired performance characteristics.

Representative examples of monofunctional, polymerizable monomers useful for forming the vinyl polymers include styrene, alpha-methylstyrene, substituted styrene, vinyl esters, vinyl ethers, N-vinyl-2-pyrrolidone, (meth) acrylamide, vinyl naphthalene, alkylated vinyl naphthalenes, alkoxy vinyl naphthalenes, N-substituted (meth)acrylamide, octyl (meth)acrylate, nonylphenol ethoxylate (meth) acrylate, N-vinyl pyrrolidone, (meth)acrylonitrile, β-cyanoethyl-(meth)acrylate, 2-cyanoethoxyethyl (meth) acrylate, p-cyanostyrene, p-(cyanomethyl)styrene, isononyl (meth)acrylate, isobornyl (meth)acrylate, 2-(2-ethoxyethoxy)ethyl (meth)acrylate, 2-ethylhexyl (meth)acrylate, beta-carboxyethyl (meth)acrylate, isobutyl (meth)acrylate, cycloaliphatic epoxide, alpha-epoxide, (meth)acrylonitrile, maleic anhydride, itaconic acid, isodecyl (meth)acrylate, lauryl (dodecyl) (meth)acrylate, stearyl (octadecyl) (meth) acrylate, behenyl (meth)acrylate, n-butyl (meth)acrylate, methyl (meth)acrylate, trimethyl cyclohexyl (meth)acrylate, ethyl (meth)acrylate, hexyl (meth)acrylate, (meth)acrylic acid, N-vinylcaprolactam, stearyl (meth)acrylate, tetradecyl (meth)acrylate, pentadecyl(meth)acrylate, hexadecyl(meth) acrylate, heptadecyl(meth)acrylate, octadecyl(meth)acrylateisooctyl (meth)acrylate, tetrahydrofurfuryl (meth) acrylate, isobornyl (meth)acrylate, glycidyl (meth)acrylate vinyl acetate, combinations of these, and the like.

In order to provide a copolymer having pendant hydroxyl groups for cross-linking purposes, one or more hydroxyl functional monomers, oligomers, and/or polymers can be incorporated into the final polymer. Pendant hydroxyl groups of the copolymer not only facilitate cross-linking, dispersion and interaction with the pigments in the formulation, but also promote dispersion and interaction with other ingredients in the composition. The hydroxyl groups can be primary, secondary, or tertiary, although primary and secondary hydroxyl groups are preferred. When used, hydroxy functional monomers constitute from about 0.5 to 30, more preferably 1 to about 25 weight percent of the monomers used to formulate the vinyl polymer.

Representative examples of suitable hydroxyl functional monomers include a variety of esters of an a, β-unsaturated carboxylic acid with one or more diols, e.g., 2-hydroxyethyl (meth)acrylate, hydroxyisopropyl (meth)acrylate, hydroxybutyl (meth)acrylate, hydroxyisobutyl (meth)acrylate, or 2-hydroxypropyl (meth)acrylate; 1,3-dihydroxypropyl-2-(meth)acrylate; 2,3-dihydroxypropyl-1-(meth)acrylate; an adduct of an a, p-unsaturated carboxylic acid with caprolactone; an alkanol vinyl ether such as 2-hydroxyethyl vinyl ether; 4-vinylbenzyl alcohol; allyl alcohol; p-methylol styrene; or the like.

Multifunctional materials including more than one carbon-carbon double bond per molecule may also be used to enhance various properties such as crosslink density, hardness, mar resistance, or the like. Examples of such higher functional, monomers include ethylene glycol di(meth)acrylate, hexanediol di(meth)acrylate, triethylene glycol di(meth)acrylate, tetraethylene glycol di(meth)acrylate, trimethylolpropane tri(meth)acrylate, ethoxylated trimethylolpropane tri(meth)acrylate, glycerol tri(meth)acrylate, pentaerythritol tri(meth)acrylate, pentaerythritol tetra(meth)acrylate, and neopentyl glycol di(meth)acrylate, divinyl benzene, combinations of these, and the like.

Suitable free radically reactive oligomer and/or polymeric materials for use in the present disclosure include, but are not limited to, (meth)acrylated urethanes (i.e., urethane (meth)acrylates), (meth)acrylated epoxies (i.e., epoxy (meth)acrylates), (meth)acrylated polyesters (i.e., polyester (meth)acrylates), (meth)acrylated (meth)acrylics, (meth) acrylated silicones, (meth)acrylated polyethers (i.e., polyether (meth)acrylates), vinyl (meth)acrylates, and (meth)acrylated oils.

Vinyl polymers of the present disclosure can be prepared by a variety of additional polymerization techniques. In preferred mode of practice, vinyl polymers of the present disclosure are prepared using free-radical polymerization methods known in the art, including but not limited to bulk, solution, and dispersion polymerization methods. The resultant vinyl polymers may have a variety of structures including linear, branched, three dimensionally networked, graft-structured, combinations thereof, and the like.

The weight ratio of the PVDF polymer to the total weight of the thermoplastic polymer and thermosetting polymer (if any) can vary over a wide range depending upon a variety of factors, including but not limited to the desired end use of the resultant coating or coated substrate. In representative modes of practice, the weight ratio of the PVDF polymer to the total weight of the thermoplastic and thermosetting polymers may be in a range of from about 0.3:1 to about 30:1.

Using greater amounts of the PVDF polymer within such range would be more desirable. However, using too much of the PVDF polymer at the higher end of such range may not be as desirable when the end use requires both durability and resilience such as might be the case when the coating of the present disclosure is formed on exterior architectural panels. In one particular architectural panel application, the weight ratio of the PVDF polymer to the total weight of the thermoplastic and thermosetting polymers is 70:25, with an additional five parts by weight of aminoplast cross-linking agent being used per 70 parts by weight of the PVDF polymer In some embodiments, the polymer particles may include a polyether polymer. The polyether polymer may contain a plurality of aromatic segments, more typically aromatic ether segments. The polyether polymer may be formed using any suitable reactants and any suitable polymerization process. The polyether polymer may be formed, for example, from reactants including an extender compound (e.g., a diol, which is preferably a polyhydric phenol, more preferably a dihydric phenol; a diacid; or a compound having both a phenol hydroxyl group and a carboxylic group) and a polyepoxide. In preferred embodiments, the polyepoxide is a polyepoxide of a polyhydric phenol (more typically a diepoxide of, e.g., a diglycidyl ether of, a dihydric phenol). Preferably, (i) the polyhydric phenol compound is an ortho-substituted diphenol (e.g., tetramethyl bisphenol F), (ii) the diepoxide is a diepoxide of an ortho-substituted diphenol (e.g., tetramethyl bisphenol F), or (iii) both (i) and (ii).

A polyether polymer may be formed from reactants including a diepoxide of an ortho-substituted diphenol (e.g., the diglycidyl ether of tetramethyl bisphenol F) and a dihydric phenol having only one phenol ring (e.g., hydroquinone, resorcinol, catechol, or a substituted variant thereof).

A polyether polymer may be prepared from reactants including a diepoxide (typically a diglycidyl ether or diglycidyl ester) that is not derived from a polyhydric phenol, and which includes one or more backbone or pendant aryl or heteroaryl groups. Such aromatic diepoxides may be prepared, for example, from aromatic compounds having two or more reactive groups such as diols, diacids, diamines, and the like. Suitable such exemplary aromatic compounds for use in forming the aromatic diepoxides include 1-phenyl-1,2-propanediol; 2-phenyl-1,2-propanediol; 1-phenyl-1,3-propanediol; 2-phenyl-1,3-propanediol; 1-phenyl-1,2-ethanediol; vanillyl alcohol; 1,2-, 1,3- or 1,4-benzenedimethanol; furandimethanol (e.g., 2,5-furandimethanol); terephthalic acid; isophthalic acid; and the like.

A polyether polymer may be prepared from reactants including one or more aliphatic polyepoxides, which are typically aliphatic diepoxides, and more typically cycloaliphatic diepoxides. Exemplary aliphatic diepoxides include diepoxides of (which are typically diglycidyl ethers of): cyclobutane diol (e.g., 2,2,4,4-tetramethyl-1,3-cyclobutanediol), isosorbide, cyclohexanedimethanol, neopentyl glycol, 2-methyl 1,3-propanediol, tricyclodecanedimethanol, 3,9-bis(1,1-dimethyl-2-hydroxyethyl)-2,4,8,10-tetraoxaspiro[5.5]undecane (PSG), and mixtures thereof Exemplary reactants, polymerization processes, and polyether polymers that may be used in making suitable polymer particles are described in U.S. Pat. No. 7,910,170 (Evans et al.), U.S. Pat. No. 9,409,219 (Niederst et al.), U.S. Pat. Pub. No. 2013/0280455 (Evans et al.), U.S. Pat. Pub. No. 2013/0316109 (Niederst et al.), U.S. Pat. Pub. No. 2013/0206756 (Niederst et al.), U.S. Pat. Pub. No. 2015/0021323 (Niederst et al.), International Pub. Nos. WO 2015/160788 (Valspar Sourcing), WO 2015/164703 (Valspar Sourcing), WO 2015/057932 (Valspar Sourcing), WO 2015/179064 (Valspar Sourcing), WO 2018/125895 (Valspar Sourcing), and WO 2021/105970 (SWIMC LLC).

The polyether polymers may alternatively be formed from ingredients that do not include any bisphenols or any epoxides of bisphenols, although non-intentional, trace amounts may potentially be present due to, e.g., environmental contamination. Examples of suitable reactants for forming such bisphenol-free polyether polymers include any of the diepoxides derived from materials other than bisphenols described in the patent documents referenced in the preceding paragraph and any of the extender compounds other than bisphenols disclosed in such patent documents. Hydroquinone, catechol, resorcinol, and substituted variants thereof, are non-limiting examples of suitable extender compounds for use in making such bisphenol-free polyether polymers.

Preferably, the polymer particles may include a polymer formed via free-radical polymerization of ethylenically unsaturated monomers, with acrylic polymers being preferred examples of such polymers. Such polymers are referred to herein as "acrylic polymers" for convenience given that such polymers typically include one or more monomers selected from (meth)acrylates or (meth)acrylic acid. Preferred acrylic polymers include organic-solution polymerized acrylic polymers and emulsion polymerized acrylic latex polymers. A suitable acrylic polymer includes a reaction product of components that include a (meth) acrylic acid ester, an optional ethylenically unsaturated mono- or multi-functional acid, and an optional vinyl compound. For example, the acrylate film-forming polymer could be a reaction product of components that include ethyl acrylate and/or butyl acrylate, acrylic acid and/or methacrylic acid, and styrene and/or cyclohexyl methacrylate (preferably in the presence of 2,2'-azobis(2-methyl-butyronitrile) and tert-butyl peroxybenzoate free radical initiators).

Examples of suitable (meth)acrylic acid esters (i.e., methacrylic acid esters and acrylic acid esters) include methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isoamyl (meth)acrylate, hexyl (meth)acrylate, 2-hydroxyethyl (meth)acrylate, 2-ethylhexyl (meth)acrylate, cyclohexyl (meth)acrylate, decyl (meth)acrylate, isodecyl (meth)acrylate, benzyl (meth) acrylate, 2-hydroxypropyl (meth)acrylate, lauryl (meth) acrylate, isobornyl (meth)acrylate, octyl (meth)acrylate, and nonyl (meth)acrylate. Any suitable isomer or combination of isomers of the above may be used. By way of example, disclosure of "butyl (meth)acrylate" is intended to disclose all isomers such as n-butyl (meth)acrylate, sec-butyl (meth) acrylate, tert-butyl (meth)acrylate, and the like. In general, as disclosed herein, unless specifically indicated to the contrary, disclosure of all isomers for a given monomer is intended.

Examples of suitable ethylenically unsaturated mono- or multi-functional acids include methacrylic acid, acrylic acid, crotonic acid, itaconic acid, maleic acid, mesaconic acid, citraconic acid, sorbic acid, and fumaric acid.

Examples of suitable vinyl compounds include styrene, halostyrene, isoprene, a conjugated butadiene, alpha-methylstyrene, vinyl toluene, vinyl naphthalene, vinyl chloride (which is not preferred), acrylonitrile, methacrylonitrile, vinyl acetate, vinyl propionate, vinyl cyclohexane, vinyl cyclooctane, vinyl cyclohexene, and vinyl stearate.

Examples of commercially available acrylic polymers include those available under the trade names VIACRYL SC 454/50BSNB, VIACRYL SC383w/50WA, and VANCRYL 2900 DEV (all from Cytec Industries Inc., West Patterson, NJ), as well as NEOCRYL A-639, NEOCRYL XK-64, URACON CR203 M3, and URACON CS113 S1G (all from DSM Neoresins BV, 5140 AC Waalwijk, Netherlands).

Exemplary acrylic polymers that may be used in making suitable polymer particles are described in U.S. Pat. No. 8,168,276 (Cleaver et al.), U.S. Pat. No. 7,189,787 (O'Brien), U.S. Pat. No. 7,592,047 (O'Brien et al.), U.S. Pat. No. 9,181,448 (Li et al.), U.S. Pat. No. 9,394,456 (Rademacher et al.), U.S. Pat. Pub. No. 2016/0009941 (Rademacher et al.), U.S. Pat. Pub. No. US2016/0376446 (Gibanel et al.), U.S. Pat. Pub. No. 2017/0002227 (Gibanel et al.), U.S. Pat. Pub. No. 2018/0265729 (Gibanel et al.), WO2016/196174 (Singer et al.), WO2016/196190 (Singer et al.), WO2017/112837 (Gibanel et al.), WO2017/180895 (O'Brien et al.), WO2018/085052 (Gibanel et al.), WO2018/075762 (Gibanel et al.), WO2019/078925 (Gibanel et al.), WO2019/046700 (O'Brien et al.), and WO2019/046750 (O'Brien et al.).

The polymer particles may include dried latex particles that include both polyether polymer and acrylic polymer. Examples of such latex particles are described, e.g., in WO2017/180895 (O'Brien et al.) and International App. No. WO2019046700 (O'Brien et al.).

Preferably, the polymer particles may include a polyolefin polymer. Examples of suitable polyolefin polymers include maleic-modified polyethylene, maleic-modified polypropylene, ethylene acrylic acid copolymers, ethylene methacrylic acid copolymers, propylene acrylic acid copolymers, propylene methacrylic acid copolymers, and ethylene vinyl alcohol copolymers.

Examples of commercially available polyolefin polymers include those available under the trade names DOW PRIMACOR 5980i, DUPONT NUCREL, POLYBOND 1103, NIPPON SOARNOL (EVOH), ARKEMA OREVAC 18751, and ARKEMA OREVAC 18360. Exemplary polyolefin polymers that may be used in making suitable polymer particles are described in U.S. Pat. No. 9,000,074 (Choudhery), U.S. Pat. No. 8,791,204 (Choudhery), International Pub. No. WO 2014/140057 (Akzo Nobel), U.S. Pat. No. 8,722,787 (Romick et al.), U.S. Pat. No. 8,779,053 (Lundgard et al.), and U.S. Pat. No. 8,946,329 (Wilbur et al.).

Suitable polyolefin particles may be prepared from aqueous dispersions of polyolefin polymer. See, for example, U.S. Pat. No. 8,193,275 (Moncla et al.) for a description of suitable processes for producing such aqueous polyolefin dispersions. Examples of commercially available aqueous polyolefin dispersions include the CANVERA line of products available from Dow, including, for example, the CANVERA 1110 product, the CANVERA 3110-series, and the CANVERA 3140-series.

The polymer particles may include an unsaturated polymer in combination with one or both of an ether component or a metal drier. The ether component may be present in the unsaturated polymer itself. While not intending to be bound by theory, it is believed that the presence of a suitable amount of unsaturation (e.g., aliphatic or cycloaliphatic carbon-carbon double bonds such as present in, e.g., norbornene groups and unsaturated structural units derived from maleic anhydride, itaconic acid, functionalized polybutadiene, and the like) in combination with a suitable amount of ether component or metal drier (e.g., aluminum, cobalt, copper, oxides thereof, salts thereof) can result in molecular weight build during thermal cure of the liquid jet or aerosol jet coating composition to form a hardened coating. See, for example, U.S. Pat. No. 9,206,332 (Cavallin et al.) for further discussion of such reaction mechanisms and suitable materials and concentrations. The polymer of the polymer particles may have an iodine value of at least 10, at least 20, at least 35, or at least 50. The upper range of suitable iodine values is not particularly limited, but in most such embodiments the iodine value typically will not exceed about 100 or about 120. The aforementioned iodine values are expressed in terms of the centigrams of iodine per gram of the material. Iodine values may be determined, for example, using ASTM D 5768-02 (Reapproved 2006) entitled "Standard Test Method for Determination of Iodine Values of Tall Oil Fatty Acids."

Optional Additives

The liquid jet or aerosol jet coating composition of the present disclosure may include one or more other optional additives to provide desired effects. For example, such optional additives may be included in the coating composition to enhance composition aesthetics, to facilitate manufacturing, processing, handling, and application of the composition, and to further improve a particular functional property of the coating composition or a hardened coating resulting therefrom. One or more optional additives may form a part of the particles themselves.

Examples of such optional additives include for example lubricants, adhesion promoters, crosslinkers, catalysts, colorants (e.g., pigments or dyes), ferromagnetic particles, degassing agents, levelling agents, wetting agents, surfactants, flow control agents, heat stabilizers, anti-corrosion agents, adhesion promoters, inorganic fillers, metal driers, and combinations thereof. The liquid jet or aerosol jet coating composition may include one or more lubricants, pigments, crosslinkers, or a combination thereof.

In preferred embodiments, liquid jet or aerosol jet coating compositions of the present disclosure include one or more lubricants, e.g., for flexibility. In this context, a lubricant is a compound that reduces the friction at the surface of a coating to impart abrasion resistance to the finished coated coil substrate. It is distinct from a flow improver that aids in the flow of the coating composition and application of a coating to a coil substrate.

Examples of suitable lubricants include carnauba wax, synthetic wax (e.g., Fischer-Tropsch wax), polytetrafluoroethylene (PTFE) wax, polyolefin wax (e.g., polyethylene (PE) wax, polypropylene (PP) wax, and high-density polyethylene (HDPE) wax), amide wax (e.g., micronized ethylene-bis-stearamide (EBS) wax), combinations thereof, and modified version thereof (e.g., amide-modified PE wax, PTFE-modified PE wax, and the like). The lubricants may be micronized waxes, which may optionally be spherical.

One or more lubricants may be present in a liquid jet or aerosol jet coating composition of the present disclosure in an amount of at least 0.1 wt-%, at least 0.5 wt-%, or at least 1 wt-%, based on the total solids content of the coating composition (i.e., the total weight of the overall hardened coating). Further, one or more lubricants may be present in an amount of up to 4 wt-%, up to 3 wt-%, or up to 2 wt-%, based on the total solids content of the coating composition (i.e., the total weight of the overall hardened coating). The concentrations in the hardened coating are equivalent to the concentrations of the starting materials in the liquid jet or aerosol jet coating composition.

The lubricant may be present in the polymer particles, on the polymer particles, in another ingredient used to form the liquid jet or aerosol jet coating composition, or a combination thereof. The lubricant may also be applied in a second liquid jet or aerosol jet coating composition that is applied in a separate layer.

Examples of suitable commercially available lubricants include the CERETAN line of products from Munzig (e.g., the CERETAN MA 7020, MF 5010, MM 8015, MT 9120, and MXD 3920 products); the LUBA-PRINT line of products from Munzig (e.g., the LUBA-PRINT 255/B, 276/A (ND), 351/G, 501/S-100, 749/PM, and CA30 products); the SST-52, 5-483, FLUOROSLIP 893-A, TEXTURE 5347W, and SPP-10 products from Shamrock; the CERAFLOUR line of products from BYK (e.g., the CERAFLOUR 981, 988, 996, 258, and 970 products); and the CERACOL 607 product from BYK.

Particle sizes of some of these lubricants, and methods used to determine such particle sizes as identified by the suppliers (although, herein, such lubricant particle sizes may be measured by laser diffraction particle size analysis), are presented in the following table.

| Supplier | Lubricant | Chemistry of Lubricant* | Particle Size* | Method* |
| --- | --- | --- | --- | --- |
| Munzing | Ceretan MA 7020 | Micronized ethylene-bis-stearamide wax | D99 <20 μm/ D50 <5 μm | LV 5 ISO 13320 |
| Munzing | Ceretan MF 5010 | Spherical, micronized PTFE modified polyolefin wax | D99 <10 μm/ D50 <4 μm | LV 5 ISO 13320 |
| Munzing | Ceretan MM 8015 | Spherical, micronized montan wax | D99 <15 μm/ D50 <6 μm | LV 5 ISO 13320 |
| Munzing | Ceretan MT 9120 | High melting, spherical, micronized Fischer-Tropsch wax | D99 <20 μm/ D50 <7 μm | LV 5 ISO 13320 |
| Munzing | Ceretan MXD 3920 | Coated, micronized wax with diamond-like hardness | D99 <20 μm/ D50 <4 μm | LV 5 ISO 13320 |
| Munzing | LUBA-print 255/B | Carnauba wax dispersion | D50: 2-3 μm/ D98: <6 μm | Picture-Particle-Analyzing System |
| Munzing | LUBA-print 276/A | Polyethylene-wax/ PTFE dispersion | D50: 2-3 μm/ D98: <8 μm | Picture-Particle-Analyzing System |
| Munzing | LUBA-print 351/G | Functional blend wax dispersion | D50: 2-3 μm/ D98: <5 μm | Picture-Particle-Analyzing System |
| Munzing | LUBA-print 501/S-100 | Polyethylene-wax dispersion | D50: 2.5-4 μm/ D98: <8 μm | Picture-Particle-Analyzing System |
| Munzing | LUBA-print 749/PM | Amide-wax dispersion | D50: 2-3 μm/ D98: <5 μm | Picture-Particle-Analyzing System |
| Munzing | LUBA-print CA 30 | Carnauba wax dispersion | D98: 3.0 μm | Single pass test |
| BYK | Ceraflour 988 | Micronized, amide-modified polyethylene wax | D50: 6 μm/ D90: 13 μm | Laser diffraction - volume distribution |
| BYK | Ceraflour 996 | Micronized, PTFE-modified polyethylene wax | D50: 6 μm/ D90: 11 μm | Laser diffraction - volume distribution |
| BYK | Ceraflour 970 | Micronized polypropylene wax | D50: 9 μm/ D90: 14 μm | Laser diffraction - volume distribution |
| BYK | Ceramat 258 | Dispersion of an oxidized HDPE wax | 30 μm | Hegman |
| BYK | Ceracol 607 | PTFE-modified polyethylene wax dispersion | D50: 4 μm/ D90: 10 μm | Laser diffraction - volume distribution |

*According to Manufacturer's Literature

In preferred embodiments, liquid jet or aerosol jet coating compositions of the present disclosure include one or more crosslinkers and/or catalysts. Additionally, or alternatively, the liquid jet or aerosol jet coating composition may include one or more self-crosslinkable polymers.

The term "crosslinker" refers to a molecule capable of forming a covalent linkage between polymers or between two different regions of the same polymer. Examples of suitable crosslinkers include carboxyl-reactive curing resins, with beta-hydroxyalkyl-amide crosslinkers being preferred such crosslinkers (e.g., available commercially under the trade name PRIMID from EMS-Griltech (e.g., the PRIMID XL-552 and PRIMID QM-1260 products) and hydroxyl-curing resins such as, for example, phenolic crosslinkers, blocked isocyanate crosslinkers, and aminoplast crosslinkers. Other suitable curing agents may include benzoxazine curing agents such as, for example, benzoxazine-based phenolic resins or hydroxy alkyl ureas. Examples of benzoxazine-based curing agents are provided in U.S. Pat. Pub. No. 2016/0297994 (Kuo et al.). Examples of hydroxy alkyl ureas are provided in U.S. Pat. Pub. No. 2017/0204289 (Kurtz et al.).

Phenolic crosslinkers include the condensation products of aldehydes with phenols. Formaldehyde and acetaldehyde are preferred aldehydes. Various phenols can be employed such as phenol, cresol, p-phenylphenol, p-tert-butylphenol, p-tert-amylphenol, and cyclopentylphenol.

The polymer particles of the present disclosure optionally may include a cross-linking agent to facilitate cross-linking of the thermosetting polymer when present. In preferred embodiments where the thermosetting polymer includes hydroxy functionality, an aminoplast cross-linking agent may be preferred. These products can have a wide range of molecular weights. Some may be monomers, oligomers, or polymers. Aminoplast crosslinkers are typically the condensation products of aldehydes such as formaldehyde, acetaldehyde, crotonaldehyde, and benzaldehyde with amino or amido group-containing substances such as urea, melamine, and benzoguanamine. Examples of suitable aminoplast crosslinking resins include benzoguanamine-formaldehyde resins, melamine-formaldehyde resins, esterified melamine-formaldehyde, and urea-formaldehyde resins. One specific example of a suitable aminoplast crosslinker is the fully alkylated melamine-formaldehyde resin commercially available from Cytec Industries, Inc. under the trade name of CYMEL 303.

Examples of other suitable crosslinkers (e.g., phenolic crosslinker, amino crosslinker, or a combination thereof) and catalysts (e.g., a titanium-containing catalyst, a zirconium-containing catalyst, or a combination thereof) are described in U.S. Pat. No. 8,168,276 (Cleaver et al.).

Condensation products of other amines and amides can also be employed as the aminoplast cross-linking agent, for example, aldehyde condensates of triazines, diazines, triazoles, guanadines, guanamines and alkyl- and aryl-substituted melamines. Some examples of such compounds are N,N'-dimethyl urea, benzourea, dicyandimide, formaguanamine, acetoguanamine, glycoluril, ammelin 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. While the aldehyde employed is most often formaldehyde, other similar condensation products can be made from other aldehydes, such as acetaldehyde, crotonaldehyde, acrolein, benzaldehyde, furfural, glyoxal and the like.

The preferred aminoplast cross-linking agent is simply a formaldehyde condensate with an amine, preferably melamine, to provide a heat-hardening methylol-functional resin. While many aminoplast resins are broadly useful, such as urea formaldehyde condensates and benzoguanamine formaldehyde condensates, it is preferred that the aminoplast resin be a polyalkoxymethyl melamine resin in which the alkoxy group contains from 1-4 carbon atoms. Appropriate melamine-formaldehyde condensates are readily available in commerce and are usually etherified with lower alcohols for use in organic solvent solution, as is well known. Examples of suitable aminoplast curing agents include an etherified melamine-formaldehyde condensate as solutions in organic solvent (e.g., a polymethoxymethyl melamine available under the trade designation CYMEL 303, available from Cytec). The aminoplast resin is typically present as from 0.1 to 10 wt. % of total resin solids, and, preferably, in an amount of from 0.2 to 3.0 wt. % of total resin solids.

While aminoplast resins are preferred for curing the hydroxy functional copolymer, it is also possible to use any curing agent reactive with hydroxy functionality, such as phenoplast resins or blocked polyisocyanates. Suitable blocked isocyanate curing agents include isophorone diisocyanate blocked with methyl ethyl ketoxime or octyl alcohol-blocked 2,4-toluene diisocyanate. The class of blocked isocyanate curing agents is well known, and these agents are well known to effect cure by forming urethane groups with the hydroxy functionality on the coating composition when baking causes the blocked isocyanate groups to dissociate and become active.

Desirably, a catalyst may be used in accordance with conventional practices to facilitate the cross-linking reaction between the hydroxy functional thermosetting resin and the aminoplast cross-linking agent. According to one representative approach, a blocked acid catalyst is used in a suitable catalytic amount. The acid is blocked with a suitable thermally labile masking group, such as an amine, so that the coating composition is substantially nonreactive at room temperature and has good storage stability. However, upon heating, the blocking amine group leaves and thereby allows the catalyst to become active and catalytically facilitate cross-linking.

One or more catalysts may be present in a liquid jet or aerosol jet coating composition of the present disclosure in an amount of at least 0.01 wt-%, based on the total weight of the liquid jet or aerosol jet coating composition, or the total weight of the overall hardened coating. One or more catalysts may be present in an amount of up to 5 wt-%, based on the total weight of the liquid jet or aerosol jet coating composition, or the total weight of the overall hardened coating. The concentrations in the hardened coating are equivalent to the concentrations of the starting materials in the liquid jet or aerosol jet coating composition.

In preferred embodiments, liquid jet or aerosol jet coating compositions of the present disclosure include one or more colorants, such as a pigment and/or dye. Examples of suitable colorants for use in the liquid jet or aerosol jet coating composition include titanium dioxide, barium sulfate, carbon black, and iron oxide, and may also include organic dyes and pigments.

One or more colorants may be present in a liquid jet or aerosol jet coating composition of the present disclosure in an amount of, for example, at least 1 wt-%, at least 2 wt-%, at least 5 wt-%, at least 10 wt-%, or at least 15 wt-%, based on the total solids content of the coating composition (i.e., the total weight of the overall hardened coating). One or more colorants may be present in an amount of up to 50 wt-%, up to 40 wt-%, up to 30 wt-%, or up to about 20%, based on the total solids content of the coating composition (i.e., the total weight of the overall hardened coating). The concentrations in the hardened coating are equivalent to the concentrations of the starting materials in the liquid jet or aerosol jet coating composition. The use of a higher colorant concentration may be advantageous to achieve good coverage with thinner coatings.

In some embodiments, the liquid jet or aerosol jet coating compositions of the present disclosure include one or more pigments. Suitable pigments can include, for example, titanium dioxide, silica, iron oxides of various colors, various silicates (e.g., talc, diatomaceous earth, asbestos, mica, clay, lead silicate, etc.), zinc oxide, zinc sulfide, zirconium oxide, lithophone, carbon black, calcium carbonate, barium sulfate, and the like. Leafing and non-leafing metallic pigments may also be used. Organic pigments known to be stable at temperatures used to cure or bake the first coating compositions may also be used. Commercially available versions of the coating composition include, for example, FLUROPON or VALFLON by Valspar, available in a range of colors across a broad color space. Accordingly, in an embodiment, the first coating composition described herein preferably includes at least one pigment present in an amount of preferably about 1 to 20 wt-%, more preferably about 5 to 15 wt-%, based on the total weight of the first coating composition.

Liquid jet or aerosol jet coating compositions of the present disclosure may include one or more inorganic fillers. Exemplary inorganic fillers used in the liquid jet or aerosol jet coating composition of the present disclosure include, for example, clay, mica, aluminum silicate, fumed silica, magnesium oxide, zinc oxide, barium oxide, calcium sulfate, calcium oxide, aluminum oxide, magnesium aluminum oxide, zinc aluminum oxide, magnesium titanium oxide, iron titanium oxide, calcium titanium oxide, and mixtures thereof.

The inorganic fillers are preferably nonreactive, and may be incorporated into the liquid jet or aerosol jet coating composition in the form of particles, preferably with a particle size distribution that is the same or smaller than that of the blend of one or more polymer particles.

One or more inorganic fillers may be present in a liquid jet or aerosol jet coating composition of the present disclosure in an amount of at least 0.1 wt-%, at least 1 wt-%, or at least 2 wt-%, based on the total solids content of the coating composition (i.e., the total weight of the overall hardened coating). One or more inorganic fillers may be present in an amount of up to 20 wt-%, up to 15 wt-%, or up to 10 wt-%, based on the total solids content of the coating composition (i.e., the total weight of the overall hardened coating). The concentrations in the hardened coating are equivalent to the concentrations of the starting materials in the liquid jet or aerosol jet coating composition.

In some embodiments, one or more pre-prepared surfactants can be used to disperse the polymer particles. In embodiments in which one or more pre-prepared surfactants are used to disperse the polymer particles, the surfactant can be an anionic, a cationic or a zwitterionic surfactant, or a mixture thereof, and also preferably includes one or more salt groups. In preferred embodiments, the surfactant includes one or more neutralized acid or anhydride groups. Examples of suitable neutralized acid groups may include carboxylate groups $COO^-$), sulfate groups ($—OSO_3—$), sulfinate groups ($—SOO^-$), sulfonate groups ($—SO_2O^-$), phosphate groups ($—OPO_3^-$), phosphinate groups ($—POO^-$), phosphonate groups ($—PO_3^-$), and combinations thereof.

Anionic surfactants are preferred in some embodiments. Examples of suitable anionic surfactants include any of the following surfactants, which preferably have been at least partially neutralized with a suitable base (e.g., any of the bases disclosed herein): any of the acid- or anhydride-functional polymeric surfactants disclosed herein, dodecylbenzene sulfonic acid, dinonylnaphthalene sulfonic acid, dinonylnaphthylenedisulfonic acid, bis(2-ethylhexyl)sulfosuccinic acid, dioctyl sulfosuccinic acid, sodium lauryl sulfate, sodium dodecyl sulfate, sodium laureth sulfate, fatty acid (ester) sulfonate, polyaryl ether phosphate acid or sulfonate acid, and the like, including mixtures thereof.

In some embodiments, it may be useful to use a surfactant that is a "strong acid" surfactant prior to neutralization. Examples of "strong acid" surfactants include surfactants having a $pK_a$ of less than 4 prior to neutralization.

Although any suitable base may be used to neutralize or partially neutralize polymeric or non-polymeric surfactants to form anionic salt groups, amines are preferred bases, with tertiary amines being particularly preferred. Some examples of suitable tertiary amines are trimethyl amine, dimethylethanol amine (also known as dimethylamino ethanol), methyldiethanol amine, triethanol amine, ethyl methyl ethanol amine, dimethyl ethyl amine, dimethyl propyl amine, dimethyl 3-hydroxy-1-propyl amine, dimethylbenzyl amine, dimethyl 2-hydroxy-1-propyl amine, diethyl methyl amine, dimethyl 1-hydroxy-2-propyl amine, triethyl amine, tributyl amine, N-methyl morpholine, and mixtures thereof. Most preferably triethyl amine or dimethyl ethanol amine is used as the tertiary amine.

Some additional examples of neutralizing bases for forming anionic salt groups include inorganic and organic bases such as sodium hydroxide, potassium hydroxide, lithium hydroxide, ammonium hydroxide, and mixtures thereof.

Some examples of neutralizing compounds for neutralizing base groups present on the surfactant and forming cationic salt groups include organic and inorganic acids such as formic acid, acetic acid, hydrochloric acid, sulfuric acid, and combinations thereof.

Although the surfactant may optionally include one or more ethylenically unsaturated groups (e.g., if the surfactant is a polymerizable non-polymeric surfactant), in some embodiments, the surfactant is a saturated surfactant. By way of example, amine-neutralized dodecylbenzenesulfonic acid is considered to be a saturated surfactant. Although amine-neutralized dodecylbenzenesulfonic acid includes an aryl group that includes carbon-carbon double bonds, it does not include any ethylenically unsaturated groups.

The surfactant can be any suitable type of surfactant and may, for example, be a "lower" molecular-weight surfactant (e.g., a surfactant that is non-polymeric and/or has a number average molecular weight of less than about 1,000 Daltons, more typically less than about 750 Daltons, and even more typically less than about 500 Daltons).

In certain preferred embodiments, a polymeric surfactant is used which has, for example, a number average molecular weight greater than about 2,000 Daltons or even greater than about 4,000 Daltons. Examples of suitable polymeric surfactants may include water-dispersible polymers of the acrylic, alkyd, polyester, polyether, polyolefin, or polyurethane type, including copolymers thereof (e.g., polyether-acrylic copolymers), and mixtures thereof. Typically, such water-dispersible polymers include one or more salt groups to facilitate stable dispersion into water. Examples of suitable such polymer salts are disclosed in U.S. Pat. No. 8,092,876 (O'Brien et al.), International Pub. No. WO 2018/013766 (Valspar Sourcing), and U.S. Pub. No. 2016/024325 (Li), which describes the use of certain (poly) ethylene (meth)acrylic acid copolymers.

An example of a specific water-dispersible polymer for use as a "polymeric surfactant" is a "higher" acid number acid-functional polymer (e.g., acid number greater than about 40, more preferably greater than about 100 milligrams KOH per gram polymer). In a preferred embodiment, an acrylic polymer having such an acid number is solution polymerized in organic solvent and then inverted into water (e.g., via at least partial neutralization with a suitable base such as, e.g., an amine or any of the other bases disclosed herein) and used to support emulsion polymerization of the ethylenically unsaturated monomer component. In some embodiments, the acid- or anhydride-functional organic solution polymerized acrylic polymer is formed from an ethylenically unsaturated monomer component that includes an acid- or anhydride functional monomer, a branched and/or cyclic monomer, and optionally any other suitable ethylenically unsaturated monomer. In some such embodiments, the acrylic polymer is styrene-free.

A variety of acid- or anhydride-functional monomers, or salts thereof, can be used; their selection is dependent on the desired final polymer properties. Preferably, such monomers are ethylenically unsaturated, more preferably, alpha, beta-ethylenically unsaturated. Suitable ethylenically unsaturated acid- or anhydride-functional monomers include monomers having a reactive carbon-carbon double bond and an acidic or anhydride group, or salts thereof. Preferred such monomers have from 3 to 20 carbons, at least 1 site of unsaturation, and at least 1 acid or anhydride group, or salt thereof.

Suitable acid-functional monomers include ethylenically unsaturated monobasic and dibasic acids, as well as anhydrides and monoesters of dibasic acids. The selected monomers preferably are readily copolymerizable with any other monomer(s) used to prepare the water-dispersible polymer. Illustrative monobasic acids include those represented by the formula $CH_2{=}C(R^8)—COOH$, where $R^8$ is hydrogen or an alkyl group of 1 to 6 carbon atoms, more typically hydrogen or methyl ($—CH_3$).

Examples of useful ethylenically unsaturated acid-functional monomers include acids such as, for example, acrylic acid, methacrylic acid, alpha-chloroacrylic acid, alpha-cyanoacrylic acid, crotonic acid, alpha-phenylacrylic acid, beta-acryloxypropionic acid, fumaric acid, maleic acid, sorbic acid, alpha-chlorosorbic acid, angelic acid, cinnamic acid, p-chlorocinnamic acid, beta-stearylacrylic acid, citraconic acid, mesaconic acid, glutaconic acid, aconitic acid, tricarboxyethylene, 2-methyl maleic acid, itaconic acid, 2-methyl itaconic acid, methyleneglutaric acid, and the like, or mixtures thereof. Preferred unsaturated acid-functional monomers include acrylic acid, methacrylic acid, crotonic acid, fumaric acid, maleic acid, 2-methyl maleic acid, itaconic acid, 2-methyl itaconic acid, and mixtures thereof. More preferred unsaturated acid-functional monomers include acrylic acid, methacrylic acid, crotonic acid, fumaric acid, maleic acid, itaconic acid, and mixtures thereof. Most preferred unsaturated acid-functional monomers include acrylic acid, methacrylic acid, maleic acid, crotonic acid, and mixtures thereof. If desired, aqueous salts of the above acids may also be employed.

Examples of suitable ethylenically unsaturated anhydride monomers include compounds derived from the above acids (e.g., as a pure anhydride or mixtures of such). Preferred anhydrides include acrylic anhydride, methacrylic anhydride, and maleic anhydride.

Examples of suitable polymerizable surfactants include those disclosed in U.S. Pub. No. 2002/0155235 (Taylor et al.); and those commercially available under the tradename REASOAP from Adeka Corporation, Tokyo, Japan; under the tradenames NOIGEN and HITENOL from Da-Ichi Kogyo Siyyaku Co., Ltd., Tokyo, Japan; and under the tradename SIPOMER from Solvay Rhodia, Brussels, Belgium.

In some embodiments, a non-ionic surfactant is included in the reaction mixture used to make the latex polymer. Any suitable non-ionic surfactant may be employed. Examples of suitable non-ionic surfactants include ethoxylated compounds. In some embodiments, the non-ionic compound is a sucrose ester, sorbitan ester, alkyl glycoside, glycerol ester, or mixture thereof. In some embodiments, a non-ionic surfactant is used that includes hydroxyl groups. Non-ionic surfactants that comprise, or are derived from, polysorbate compounds may be used in some embodiments.

In some embodiments, a surfactant or mixture of surfactants as described in U.S. Pub. No. 2020/385601 (Gibanel et al.) may be used. For example, one or more anionic or zwitterionic surfactant (e.g., non-polymeric surfactant) having an acid group neutralized with a metallic base may be used (e.g., a metallic base including aluminum, calcium, lithium, magnesium, sodium, or potassium). An example of such a surfactant is dioctyl sodium sulfosuccinate. One or more surfactants may be present in a liquid jet or aerosol jet coating composition of the present disclosure in an amount of at least 0.1 wt-%, or at least 0.2 wt-%, based on the total solids content of the coating composition (i.e., the total weight of the overall hardened coating). One or more surfactants may be present in an amount of up to 10 wt-%, or up to 5 wt-%, based on the total solids content of the coating composition (i.e., the total weight of the overall hardened coating).

Standard methods of mixing may be used to form the water-based dispersions.

Coated Substrate

The present disclosure also provides a coated substrate. Hardened (e.g., cured) coatings of the disclosure preferably adhere well to metal (e.g., steel, stainless steel, electrogalvanized steel, tin-free steel (TFS), tin-plated steel, electrolytic tin plate (ETP), aluminum, etc.).

Substrates that may be useful herein can include metals, wood, paper, ceramics and glass, polymers, leather, woven and nonwoven fabric, fibers, combinations of these (whether synthetic and/or natural), and the like. Particularly suitable substrates include steel, aluminum, zinc, copper, as well as alloys, inter-metallic compositions, composites including one or more of these, and/or the like. Non-limiting examples of coil substrates that may benefit from having a coating composition of the present disclosure applied on a surface thereof include hot-rolled steel, cold-rolled steel, hot-dip galvanized, electro-galvanized, aluminum, tin plate, various grades of stainless steel, and aluminum-zinc alloy coated sheet steel (e.g., GALVALUME sheet steel). Representative supplies of the substrates include, but are not limited to extrusions, coils or otherwise fabricated substrates intended to be converted into building panels, roofing panels, automotive body parts, aluminum extrusions, and the like, for example.

Useful substrates may include those having variable thicknesses, which may depend at least in part on the identity thereof, the ultimate purpose of the substrate being coated, desired properties, a final article or articles being formed therefrom, or any combination thereof. In some embodiments, useful average thicknesses of coil substrates may be 250 m or greater, 300 m or greater, 350 m or greater, 400 m or greater, 450 m or greater, 500 m or greater, 600 m or greater, or 700 m or greater. The thickness of the coil substrate may be 5 mm or less, 3 mm or less, 2 mm or less, 1.5 mm or less, 1.3 mm or less, 1 mm or less, 800 m or less, 760 m or less, 700 m or less, 650 m or less, or 610 m or less.

Useful substrates may include coils of materials having various dimensions. For example, in some embodiments, useful coils can include those having a coil width (the width of a coil can be considered the dimension that is perpendicular to the direction in which a coil is rolled and/or unrolled) of not less than 12 inches, not less than 24 inches, not less than 36 inches, or even not less than 40 inches for example. For example, in some embodiments, useful coils can include those having a coil width of not greater than 144 inches, not greater than 96 inches, not greater than 72 inches, or even not greater than 60 inches for example.

In the context of a hardened adherent coating being disposed "on" a surface or substrate, both coatings applied directly (e.g., virgin metal or pre-treated metal such as electroplated steel) or indirectly (e.g., on a primer layer) to the surface or substrate are included. Thus, for example, a coating applied to a pre-treatment layer (e.g., formed from a chrome or chrome-free pretreatment) or a primer layer overlying a substrate constitutes a coating applied on (or disposed on) the substrate.

If a steel sheet is used as the coil substrate, the surface treatment may comprise one, two, or more kinds of surface treatments such as zinc plating, tin plating, nickel plating, electrolytic chromate treatment, chromate treatment, and phosphate treatment. If an aluminum sheet is used as the coil substrate, the surface treatment may include an inorganic chemical conversion treatment such as chromic phosphate treatment, zirconium phosphate treatment, or phosphate treatment; an organic/inorganic composite chemical conversion treatment based on a combination of an inorganic chemical conversion treatment with an organic component as exemplified by a water-soluble resin such as an acrylic resin or a phenol resin, and tannic acid; or an application-type treatment based on a combination of a water-soluble resin such as an acrylic resin with a zirconium salt.

The coil substrate may be cryogenically cleaned. It may be provided as a cryogenically cleaned coil substrate, or the method coating may include cryogenically cleaning the coil substrate prior to directing a powder coating composition to at least a portion of the substrate. In an exemplary process, cryogenic cleaning may be achieved by directing a high-pressure stream of liquid nitrogen (between 5,000 and 50,000 psi and between 150° F. and 250° F.) at the metal surface. The temperature of the metal surface decreases rapidly, causing fracturing of any contaminants. The fractured contaminants are then directed away from the metal surface by the high-pressure stream, leaving behind a cleaned substrate.

In preferred embodiments, the hardened adherent coating is continuous. As such, it is free of pinholes and other coating defects that result in exposed substrate.

In certain embodiments, the hardened, preferably continuous, adherent coating has an average thickness of up to 100 microns (particularly if the coating has texture), or a maximum thickness up to 100 microns. Preferably, the hardened, preferably continuous, adherent coating has an average thickness of up to 60 microns, up to 55 microns, up to 50 microns, up to 45 microns, or even up to 35 microns. Preferably, the hardened continuous adherent coating has an average thickness, or a minimum coating thickness, of not less than 1 micron, not less than 10 microns, not less than 24 microns, not less than 30 microns, or even not less than 45 microns for example. Without being limited to theory, a coating thickness of less than 1 microns would not include sufficient pigment to provide the required degree of color to the cured film. On the other hand, a coating thickness of greater than 40 microns would produce a brittle film that may bend or crack when a coated article is formed from the substrate. In some embodiments, more than one layer of the first coating may be applied, and in such cases, the total thickness of the first coating may vary from preferably about 30 to 60 microns, more preferably 45 to 55 microns.

The liquid jet or aerosol jet coating compositions of the present disclosure may also be used on a number of types of substrates and for a wide variety of applications including, for example, metal building panels, metal roofs, wall panels, garage doors, office furniture, home appliances, heating and cooling panels, automotive panels and parts, and the like. The liquid jet or aerosol jet coating composition may be applied to sheet metal such as is used for lighting fixtures, architectural metal skins (e.g., gutter stock, window blinds, siding, window frames, and the like) by spraying, dipping, or brushing, but is particularly suited for a coil coating operation where the liquid jet or aerosol jet coating composition is applied onto the sheet as it unwinds from a coil and then baked as the sheet travels toward an uptake coil winder. It is further contemplated that the liquid jet or aerosol jet coating composition of the present disclosure may have utility in a variety of other end uses, including, industrial coating applications such as, e.g., appliance coatings; packaging coating applications; interior or exterior steel building products; HVAC applications; agricultural metal products; wood coatings; etc.

In some embodiments, the substrate may be in the form of a planar coil or sheet. Sheet coating involves applying a coating composition to separate pieces of a substrate that have been pre-cut into square or rectangular "sheets." Coil coating is a special application method in which coiled metal strips (e.g., aluminum) are unwound and then passed through pretreating, coating, and drying equipment before finally being rewound. It is believed the use of preferred liquid jet or aerosol jet coating compositions of the present disclosure can eliminate the need for the pretreatment step employed when using conventional liquid coatings, thereby simplifying the application process and removing cost. Coil coating allows for very efficient coating of large surface areas in a short time at high throughput. Thus, the process of applying a liquid jet or aerosol jet coating composition to a substrate according to the present disclosure is preferably used in a coil-coating process or in a sheet-coating process.

The hardened coating may be formed from a liquid jet or aerosol jet coating composition as described herein with or without one or more optional additives, particularly one with the polymer particles described herein and a lubricant. The lubricant may be present in the hardened coating in the polymer particles, on the polymer particles, in another ingredient used to form the liquid jet or aerosol jet coating composition (or the hardened coating formed therefrom), or a combination thereof. Alternatively or additionally, a lubricant as described herein (e.g., carnauba wax, synthetic wax, polytetrafluoroethylene wax, polyethylene wax, polypropylene wax, or a combination thereof) may be incorporated into or on the hardened coating, a lubricant is preferably present in an amount of at least 0.1 wt-% (or at least 0.5 wt-%, or at least 1 wt-%), and a lubricant is preferably present in an amount of up to 4 wt-% (or up to 3 wt-%, or up to 2 wt-%), based on the total solids content of the liquid jet or aerosol jet coating composition (i.e., the total weight of the overall hardened coating). The concentrations in the hardened coating are equivalent to the concentrations of the starting materials in the liquid jet or aerosol jet coating composition.

Preferably, a hardened coating, which includes an amorphous polymer (and/or semicrystalline polymer with amorphous portions), has a glass transition temperature (Tg) of at least 15° C., at least 20° C., or at least 25° C. and a Tg of up to 150° C., up to 125° C., up to 110° C., up to 100° C., up to 80° C., or up to 50° C.

In some cases, the hardened coating may not have any detectable Tg.

The coated article described herein preferably demonstrates suitable pencil hardness for the intended purpose of the coated article. In certain preferred embodiments, the coating exhibits a pencil hardness of B or greater. The coating may exhibit a pencil hardness of 3H or lower. The pencil hardness of the coating may be in a range of B to 3H or F to 2H.

The coated article described herein preferably demonstrates optimal weathering or weather resistance. By "weather resistance" is meant the resistance of the coating to degradation by exposure to UV radiation (i.e., sunlight) over an extended period of time. Weathering can be determined using the Weathering Resistance Test described in the Test Methods, which measure the ability of a coated substrate to demonstrate optimal weathering.

Coated substrates of the present disclosure may be drawn and redrawn. Significantly, the coating on the resultant thinned substrate remains continuous and adherent.

Methods of Coating

The present disclosure provides methods of coating a substrate suitable for use in forming a coated substrate or an article that includes a coated substrate that involves forming a patterned coating. This method uses any of the variety of liquid jet or aerosol jet coating compositions, including polymer particles and additives, and any of the general systems and methods described herein. The general descriptions of the coatings also apply to the coatings that result from this method.

For example, in some embodiments, disclosed methods can include: providing a liquid jet or aerosol jet coating composition as described herein; directing the liquid jet or aerosol jet coating composition to at least a portion of the substrate; and providing conditions effective for the liquid jet or aerosol jet coating composition to form a hardened, preferably continuous, adherent coating on at least a portion of the substrate.

In another embodiment, a coating method includes: providing a substrate; providing a liquid jet or aerosol jet coating composition as described herein; selectively applying the liquid jet or aerosol jet coating composition to at least a portion of the substrate to form a patterned coating; and providing conditions effective for the liquid jet or aerosol jet coating composition to form a hardened adherent patterned coating on at least a portion of the substrate. This is a method of selectively applying or printing the liquid jet or aerosol jet coating composition.

In another embodiment, a coating method includes applying multiple layers of liquid jet or aerosol jet coating compositions disclosed herein. More than two (for example, three or more, four or more, or five or more) dissimilar liquid jet or aerosol jet coating compositions may be applied to make a hardened coating. The dissimilar liquid jet or aerosol jet coating compositions typically will differ with respect to at least one physical or chemical properties. Representative such properties may include for example polymer particle properties such as molecular weight, density, glass transition temperature (Tg), melting temperature (Tm), intrinsic viscosity (IV), melt viscosity (MV), melt index (MI), crystallinity, arrangement of blocks or segments, availability of reactive sites, reactivity, acid number, as well as coating composition properties such as surface energy, hydrophobicity, oleophobicity, moisture or oxygen permeability, transparency, heat resistance, resistance to sunlight or ultraviolet energy, adhesion to metals, color or other visual effects, and recyclability. For properties measured on an absolute scale, the dissimilar properties (i.e., a particular property of at least two different liquid jet or aerosol jet coating compositions) may, for example, differ by at least ±5%, at least ±10%, at least ±15%, at least ±25%, at least ±50%, at least ±100%, or more.

Thus, in one embodiment, the present disclosure provides a method of coating a substrate includes: providing a substrate; providing multiple liquid jet or aerosol jet coating compositions, wherein at least two of the multiple liquid jet or aerosol jet coating compositions are different; directing each of the multiple coating compositions to at least a portion of the substrate such that at least one coating composition is deposited on another different coating composition (either prior to or after hardening of the underlying coating composition to form a coating); and providing conditions effective for the multiple liquid jet or aerosol jet coating compositions to form a hardened, preferably continuous, adherent coating on at least a portion of the substrate.

Multi-layer structures are preferably formed using an aerosol jet coating process with at least partial drying to solidify the sub-layer structures before printing the top layer structure (see, e.g., the multi-layered printed electronic devices produced using aerosol jet printing in ACS Appl. Mater. Interfaces 2014, 6 18704-18711).

The conditions effective for the liquid jet or aerosol jet coating composition to form a hardened coating on at least a portion of the substrate preferably includes applying thermal energy (e.g., using a convection oven or induction coil), UV radiation, IR radiation, or electron beam radiation to the liquid jet or aerosol jet coating composition. Such processes can be carried out in one or more discrete or combined steps. The conditions may include applying thermal energy. Applying thermal energy may include using oven temperatures of at least 100° C. or at least 177° C. Applying thermal energy may further include using oven temperatures of up to 300° C. or up to 250° C. Applying thermal energy may include heating the coated substrate over a suitable time period to a peak metal temperature (PMT) of at least 177° C. Preferably, applying thermal energy includes heating the coated substrate over a suitable time period to a peak metal temperature (PMT) of at least 218° C. The time period may be as short as 0.5 second, or less than 1 second, or less than 3 seconds, or 5 seconds, or as long as 15 minutes, preferably less than 12 minutes, and preferably less than one minute for forming a coil coating. Preferably, this occurs in a continuous process.

Methods of coating using a water-based dispersion in a liquid jet or aerosol jet system according to the present disclosure for making coated coils can be adapted from conventional inkjet printing as described, for example, in U.S. Pat. No. 7,279,506 (Sisler et al.), U.S. Pat. No. 9,428,663 (Song et al.), U.S. Pat. Pub. No. 2008/0062381 (Doshi et al.), and U.S. Pat. No. 10,045,938 (Doshi).

Generally, liquid jet coating uses an array of small liquid jets typically controlled by individual piezoelectric valves that turn the flow of the coating composition on or off. Typically, the jet is trained on the surface to be coated, and the piezoelectric valve is controlled by a computer that can either print a monolithic film or a pattern based on the desire of the operator. With this type of application process, the coating remains in the liquid form when it contacts the substrate.

Generally, aerosol jet coating converts a liquid coating composition to an aerosol, e.g., using ultrasonic energy. The aerosol is accelerated pneumatically through a small tube and eventually transferred to a substrate through a small nozzle. Significant evaporation occurs during this process, and the coating is largely a solid once it contacts the substrate.

Both liquid jet and aerosol jet coating methods offer significant improvement over traditional roll or spray applied substrate coatings.

Method of Coating a Substrate Using Liquid Jet Coating

A general schematic of an exemplary liquid jet coating system is shown in FIG. 1. Arrow (1) indicates the direction of flow of a water-based dispersion coming from a holding reservoir (not shown). A piezoelectric diaphragm (2) controls the flow of the water-based dispersion to and through a nozzle (3), which is a constricting point where a droplet (4) is generated. The newly generated droplet (4) then moves toward a substrate (5) to be coated. After the droplet (4) is applied to the substrate (5), it flows or wets out the substrate forming a portion of a liquid-jet applied coating (6).

The printheads described herein may be used to apply coating compositions of the present disclosure, as well as any other suitable printheads capable of providing liquid jet or aerosol jet coating known in the art. One set of preferred printheads may be referred to as Drop-on-Demand (DoD) printheads and such printheads usually contain multiple nozzles (e.g., 100 to 1000, although specialist printheads may contain only a single nozzle), and instead of drop ejection resulting from external fluid pressure as in continuous inkjet printing (CIJ) printing, the kinetic energy of the drops derive from sources located within the printhead, typically very close to each nozzle. In one example of a potentially suitable printhead, a DoD squeeze-mode printhead includes of a hollow tube of piezoelectric material controlled by electrical signal. A voltage is applied to the piezoelectric electrodes causing them to contract, squeezing the chamber containing a water-based dispersion and forcing a droplet out of the nozzle.

Another example of a potentially suitable printhead is a DoD bend-mode printhead, which consists of a piezoelectric disk mounted on one side of the ink chamber. The pulsed electrical signal causes the one side of the chamber to flex inwardly, which reduces the volume of the chamber. The sudden reduction in volume generates pressure pulsed required to push a droplet out of the nozzle.

Another example of a potentially suitable printhead is a DoD push-mode piezoelectric print head, which includes a piezoelectric rod placed next to the nozzle part of the chamber. The pulsed electrical signal caused the piezoelectric rod to expand and thus squeeze out the ink droplet.

Still another example of a potentially suitable printhead is a DoD shear-mode printhead. The shear mode printheads are designed such that shear deformation in the piezoelectric element is used to deform the upper half of the channels. This deformation is mirrored in the lower half of the channel forcing the channel into a chevron shape. Flexing of the channel induces droplet ejection. This is further described in Circuit World 2012, Vol. 38, 4, 193-213.

Among the printheads that may be used to deliver the coatings described herein, many use the deformation of a piezoelectric ceramic element for this purpose, while in other types (e.g., thermal inkjet heads) the pressure pulse which ejects the drop is generated from the expansion of a small bubble of vapor produced by the action of a small electrical heating element on the liquid itself. There are advantages and disadvantages of both types of actuation. Piezoelectric printheads can typically handle a wider range of liquids than thermal printheads (which are restricted to fluids which will satisfactorily vaporize), while the latter can be simpler and cheaper to fabricate. This is further described in Intl. J. Pharm. 2015, 494, 554-567.

Compositions of the current disclosure are particularly well suited for large-format, industrial scale liquid jetting applications, such as the Powercoat technology developed by Archipelago Technology Group Ltd., Cambridge, UK. In the case of this unique print engine, a cylindrical print head, or roll, is employed that contains a multitude (e.g., a plurality) of liquid jetting nozzles distributed evenly across the surface of the roll (i.e., cylindrical print head). It is a particular feature of this printing method that higher viscosity fluids (such as those described by the broadest ranges of the present disclosure) can be coated onto a planar substrate. This style of print engine is described in detail in U.S. Pat. Pub. No. 2021/0031221 A1 (Mace).

Method of Coating a Coil Substrate Using Aerosol Jet Coating

Figure 2:
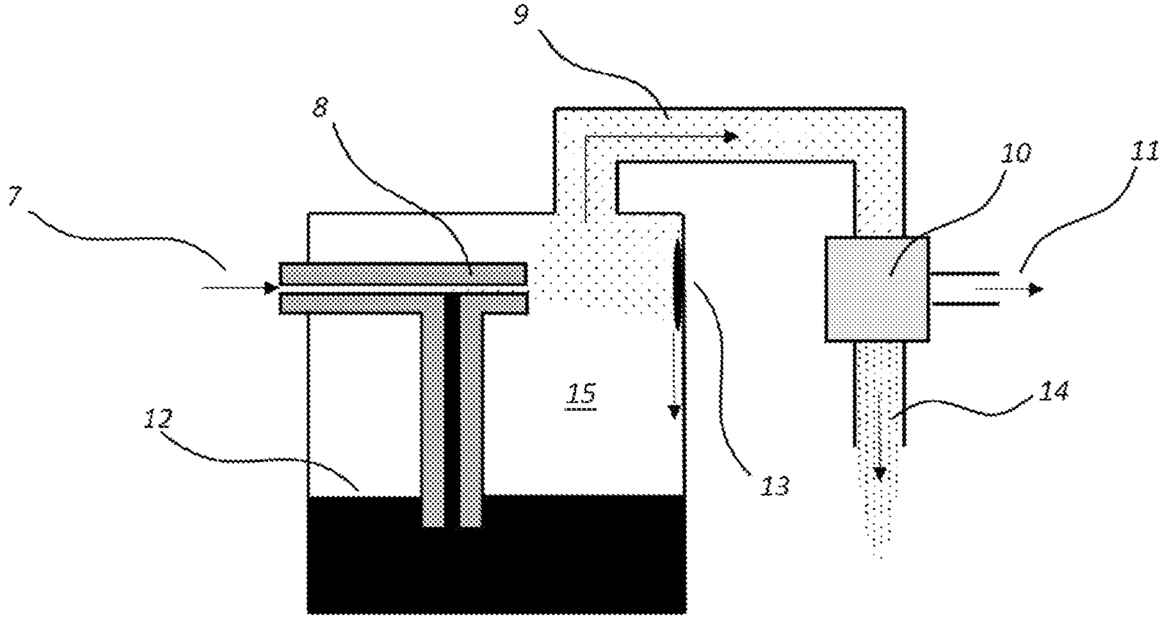
FIG. 2 is a schematic of an exemplary aerosol jet application system using the venturi effect.

A general schematic of an exemplary aerosol jet coating system is shown in FIG. 2 using the Venturi effect. Arrow (7) indicates the direction of flow of a carrier gas used to drive the Venturi mechanism. At region (8), a cross-flow of carrier gas creates a vacuum that draws a water-based dispersion (12) located in reservoir (15). Turbulence at this intersection generates an aerosol out of the water-based dispersion. Arrow (9) indicates the direction of flow of small aerosol droplets out of the reservoir (15). The aerosol droplets contact a virtual impactor (10) that condenses the aerosol. Arrow (11) indicates the direction of flow of exhaust of excess vapor resulting in a condensed aerosol. Arrow (14) indicates the direction of flow of condensed aerosol to a nozzle (not shown) for application to a substrate. Large condensed droplets of the aerosol contact the wall (13) of the reservoir (12) and return to the bulk water-based dispersion via gravity.

The pneumatic atomization (Venturi effect) technique can be used to generate aerosols to allow for depositing high viscosity liquids (up to 1000 cps). This is described in Int. J. Adv. Manuf Technol. 2019, 105, 4599-4619.

Figure 3:
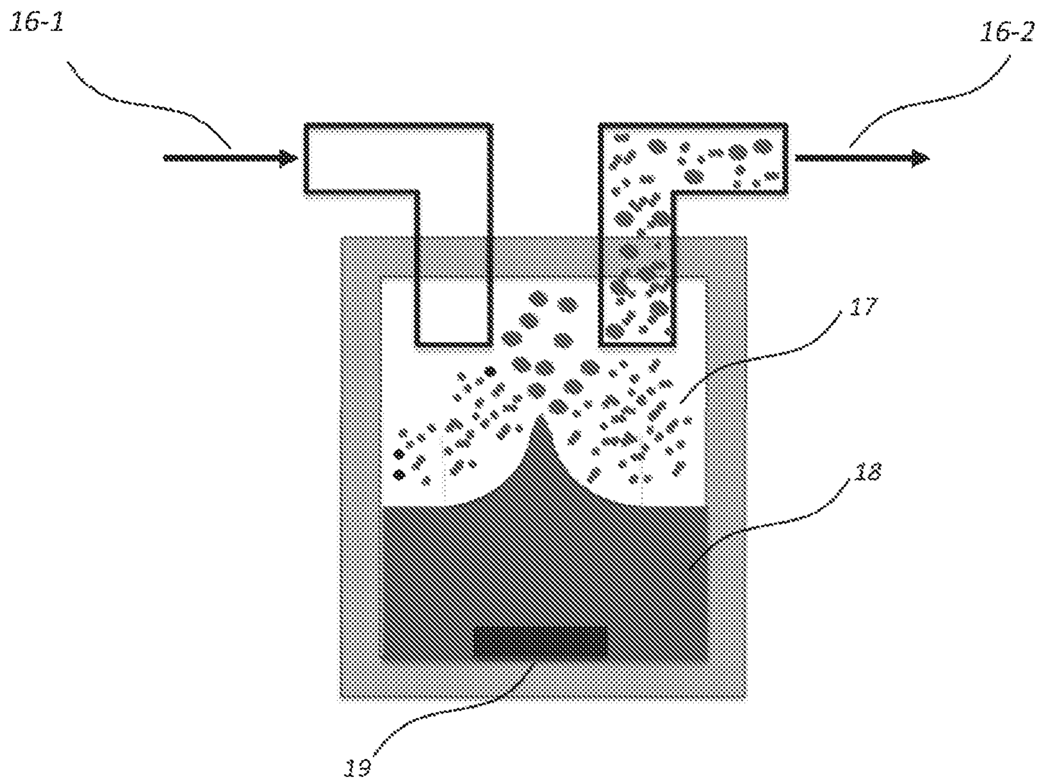
FIG. 3 is a schematic of an exemplary aerosol jet application system using ultrasonic energy.

A general schematic of an exemplary aerosol jet coating system using ultrasonic energy is shown in FIG. 3. In this method, ultrasonic atomization is used to generate droplets of the water-based dispersion. Arrow (16-1) indicates the direction of flow of a carrier gas which contacts aerosol droplets (17). The aerosol droplets are formed by ultrasonication from a water-based dispersion (18) using an ultrasonic transducer (19). Arrow (16-2) indicates the direction of flow of the generated aerosol droplets to a nozzle (not shown) for application to a substrate. Further details of this system and its operation are described in U.S. Pat. Pub. No. 2005/0156991 (Renn).

In a method that used ultrasonic energy, due to the micron-scale size of the droplets, solvent evaporation occurs rapidly, resulting in a reduction in droplet size. A carrier gas, referred to herein as the aerosol gas, transports the droplets to a deposition head (i.e., nozzle). During transit, two mechanisms can lead to losses gravitational settling and impingement on tube walls by diffusion. In the deposition head, a sheath gas surrounds the aerosol gas, collimating the beam. As they pass through a deposition head or nozzle, droplets can be diverted from their flow stream due to inertial effects in the narrow, converging nozzle, leading to aerodynamic focusing. Finally, the droplets can be directed towards the substrate in an impinging jet. This process if further described in Ind. Eng. Chem. Res. 2015, 54, 769-779.

Figure 4:
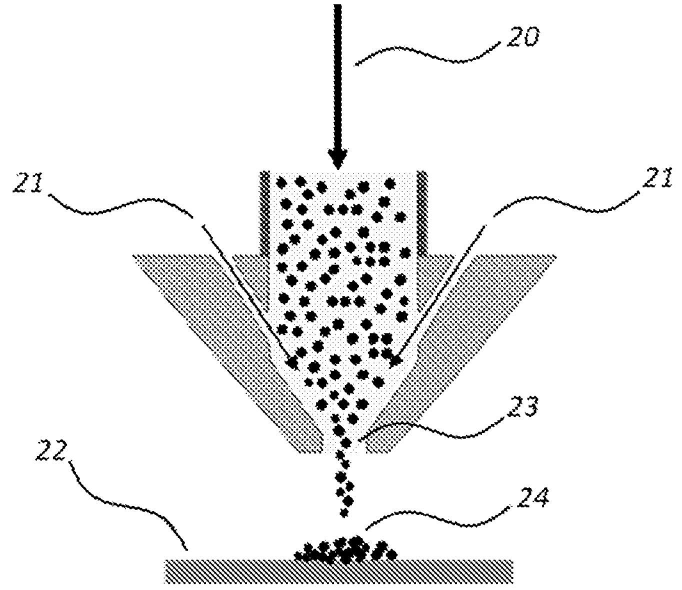
FIG. 4 is a schematic of an exemplary nozzle used in an aerosol jet application system.

A general schematic of an exemplary aerosol jet coating deposition head or nozzle is shown in FIG. 4. Arrow (20) indicates the direction of flow of condensed aerosol coming from a reservoir via ultrasonication/pneumatic atomization. A sheath gas (21), such as dry $N_2$ (HP grade, 99.998%) accelerates and focuses the condensed aerosol into a stream (23) toward a substrate (22) to be coated. The sheath gas ensures that the aerosol does not contact the walls of the nozzle, resulting in less nozzle fouling and plugging. After the aerosol stream (23) is applied to the substrate (22), it condenses on the substrate forming a portion of an aerosol-jet applied coating (24).

In certain embodiments of methods of the present disclosure, a multi-head apparatus, as described in U.S. Pat. No. 10,328,680 (Pervan) may be used.

Multi-Layer Coating Methods, Systems, and Resultant Products

The present disclosure also provides a method of coating a coil substrate that involves multi-layer coating, generally forming layers of the liquid jet and/or aerosol jet coating compositions disclosed herein. In this context, a multi-layer coating involves applying a liquid or aerosol jet coating composition onto a liquid or aerosol jet coating composition as well as a liquid or aerosol jet composition onto a hardened liquid or aerosol jet coating. This method uses any of the variety of liquid or aerosol jet coating compositions, including polymer particles and additives, and any of the systems and methods described herein. The general descriptions of the coatings also apply to the coatings that result from this method.

Layers containing the disclosed liquid or aerosol jet coating compositions may be combined in a variety of ratios and in any desired order to form the resultant hardened, preferably continuous, adherent coating. For example, first and second dissimilar liquid or aerosol jet coating compositions may be used to form a hardened coating containing from 99 wt-% to 1 wt-% of a first liquid or aerosol jet coating composition and from 1 wt-% to 99 wt-% of a second liquid or aerosol jet coating composition, from 95 wt-% to 5 wt-% of a first liquid or aerosol jet coating composition and from 5 wt-% to 95 wt-% of a second liquid or aerosol jet coating composition, from 90 wt-% to 10 wt-% of a first liquid or aerosol jet coating composition and from 10 wt-% to 90 wt-% of a second liquid or aerosol jet coating composition, or from 80 wt-% to 20 wt-% of a first liquid or aerosol jet coating composition and from 20 wt-% to 80 wt-% of a second liquid or aerosol jet coating composition, etc.

More than two (for example, three or more, four or more, or five or more) dissimilar liquid or aerosol jet coating compositions may be applied to make a hardened multi-layer coating. The dissimilar liquid or aerosol jet coating compositions typically will differ with respect to at least one physical or chemical property. Representative such properties may include polymer particle properties such as molecular weight, density, glass transition temperature (Tg), melting temperature (Tm), intrinsic viscosity (IV), melt viscosity (MV), melt index (MI), crystallinity, arrangement of blocks or segments, availability of reactive sites, reactivity, acid number, as well as coating composition properties such as surface energy, hydrophobicity, oleophobicity, moisture or oxygen permeability, transparency, heat resistance, resistance to sunlight or ultraviolet energy, adhesion to metals, color or other visual effects, and recyclability. For properties measured on an absolute scale, the dissimilar properties (i.e., a particular property of at least two different liquid or aerosol jet coating compositions) may, for example, differ by at least ±5%, at least ±10%, at least ±15%, at least ±25%, at least ±50%, at least ±100%, or more.

Thus, in one embodiment, the present disclosure provides a method of coating a coil substrate that includes: providing a coil substrate; providing multiple liquid or aerosol jet coating compositions, wherein each liquid or aerosol jet coating composition comprises polymer particles, and at least two of the multiple liquid or aerosol jet coating compositions are different; directing each of the multiple liquid or aerosol jet coating compositions to at least a portion of the coil substrate such that at least one liquid or aerosol jet coating composition is deposited on another different liquid or aerosol jet coating composition (either prior to or after at least partially hardening of the underlying liquid or aerosol jet coating composition to form a coating); and providing conditions effective for the multiple liquid or aerosol jet coating compositions to form a hardened, preferably continuous, adherent coating on at least a portion of the coil substrate. At least partially hardening (e.g., by heating) the underlying coating composition is preferred to at least partially remove liquid (e.g., organic solvent or water) to resist impact of the of the subsequently applied coating composition and avoid mixing the layered coating compositions.

Although the method can involve providing conditions effective for each of the liquid or aerosol jet coating compositions to form a hardened, preferably continuous, adherent coating between depositing layers of different liquid or aerosol jet coating compositions, preferably the method involves providing conditions effective for each of the liquid or aerosol jet coating compositions to form a hardened, preferably continuous, adherent coating after depositing all the layers of different liquid or aerosol jet coating compositions.

A particular advantage of applying multiple different liquid or aerosol jet coating compositions is that each composition can be chemically different and/or physically different, and provide a specific function that would otherwise be difficult to achieve with a single material. For example, hardness and flexibility can be quite difficult to achieve in a single coating composition, because they are achieved by incorporating dissimilar functionalities and architectures into the polymer backbone of the coating. Moreover, relative to conventional multi-layer packaging coating approaches (e.g., using conventional liquid applied coating approaches for each layer such as roll coating, spray coating, and the like), performance enhancements and/or cost savings can be realized by selectively applying one or more liquid or aerosol jet coating layers in a multi-layer coating system only where that particular layer is desired (e.g., as opposed to "all-over coating" for the given layer).

Figure 5:
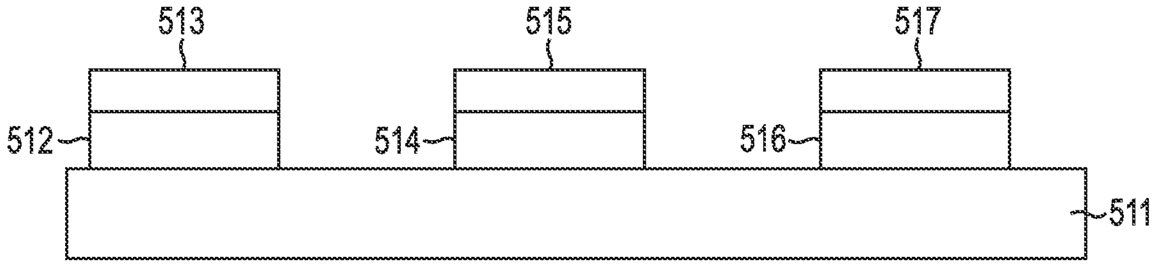
FIG. 5 provides schematics of representative examples of assemblies that include multilayer coatings.

FIG. 5 provides schematics of representative examples of assemblies that include multilayer coatings. As shown on the left side of the substrate 511 in FIG. 5, using this method, a lubricant 513 may be applied in a second liquid or aerosol jet coating composition on a base liquid or aerosol jet layer 512 on substrate 511, prior to cure of the base liquid or aerosol jet layer, only where needed, thereby eliminating the need for applying lubricant globally. In most cases, this lubricant layer will be selectively applied in a patterned format such that it only covers 50% or less of the base liquid or aerosol jet coating layer and/or is typically not thicker than the particle size of the lubricant applied.

In certain embodiments that include multi-layer liquid or aerosol jet coating compositions, each of the compositions do not include lubricant.

As shown in the middle portion of the substrate 511 in FIG. 5, two chemically different liquid or aerosol jet coating compositions may be applied—a first liquid or aerosol jet coating composition 514 may be applied to form a color coating, and then a second (different) liquid or aerosol jet coating composition 515 may be applied to form an outermost (i.e., top) clear coating over the colored coating 514.

As shown on the right side of the substrate 511 in FIG. 5, a first liquid or aerosol jet coating composition 516 can be applied to provide a relatively soft coating layer, and a second liquid or aerosol jet coating composition 517 can be applied (i.e., deposited) to provide a relatively hard top (i.e., outermost) coating layer. In this context, soft and hard are used as terms to describe the relative hardness or softness (Tg) of the resultant first and second coatings (as opposed to a "hardened" coating). The softer coating 516 provides flexibility and a primer layer which enhances adhesion of the hard top coating layer 517, whereas the harder coating 517 provides an abrasion-resistant top coating.

Another example of multi-layer architectures includes the use of multiple differently colored liquid or aerosol jet coating compositions that can be used in color-on-color printing to generate a new color. Thus, the multiple liquid or aerosol jet coating compositions can include a base set of colors that can be mixed to form other colors. Similar to the way a desktop printer works, a multi-color-plus-black scheme (preferably a three-color-plus-black scheme) could be used to print an infinite array of colors from only four liquid or aerosol jet coating composition sources, typically magenta, cyan, yellow, and black. For color development layers where a preceding or subsequent layer is providing a continuous protective layer over the coil substrate, a pixel approach to achieve an infinite array of colors may be used. In this way, individual pixels or points (sufficiently small so as not to be detected by the human eye), can be printed onto the substrate such that the array of pixels or points on the substrate appear to the human eye to be a result of blending of those colors. For example, a 1:1 blend of cyan and yellow pixels would appear green to the unaided eye.

Mechanically, this array of colors could be achieved by arranging an appropriate number of liquid or aerosol jet coating apparatuses (one for each color) in a row, so that each one deposits a proscribed liquid or aerosol jet coating composition onto the substrate, with each one depositing its coating composition on top of the previous layer.

Yet another example of multi-layer liquid or aerosol jet coating architectures that could be of utility in the coil coating industry includes the use of a pretreatment base layer. Traditional non-chrome aluminum pretreatments consist of molybdenum and/or zirconium compounds (often in a polyacrylic acid matrix) that are coated in a very thin (sub-micron) layer prior to the protective coating. In some applications, the polyacrylic acid sealer layer provides a significant percentage of the pretreatment performance advantage. This pretreatment process is often complicated and messy. It would be beneficial to use a liquid or aerosol jet coating composition in a very thin layer of a pretreatment metal compound sealer, or potentially just sealer by itself.

A multi-layer liquid or aerosol jet coating architecture may include multiple liquid or aerosol jet coating compositions deposited in a manner to form a textured surface (e.g., detectible by unaided human senses visually and/or by touch). The texture results from the coating being applied to a smooth/flat metal substrate. Alternatively, a multi-layer liquid or aerosol jet coating architecture may include multiple liquid or aerosol jet coating compositions deposited in a manner to form a smooth/flat surface. The smooth/flat surface results from the coating being applied to a smooth/flat metal substrate or a textured substrate.

The textured or smooth surface may be detectable to human eye and/or human touch, or alternatively, the texture can be measured and reported as an Arithmetical Mean Roughness (Ra). Arithmetical mean roughness indicates the average of the absolute value along the sampling length and can be measured with, for example, a 3D surface profiler such as the Keyence VK-X3000.

A multi-layer liquid or aerosol jet coating architecture may result in a hardened, preferably continuous, adherent coating that forms markings, as described for the patterned coating method.

A multi-layer liquid or aerosol jet coating architecture may result in a hardened, preferably continuous, adherent coating having different thicknesses across a coated surface as a result of the liquid or aerosol jet coating composition being deposited in different amounts. For example, the hardened adherent coating may have an average total thickness of up to 100 microns, or a maximum total thickness up to 100 microns. Typically, however, one or both of the maximum and average total thickness will be appreciably thinner than 100 microns (e.g., 50 microns or less or 30 microns or less, particularly for liquid jet). The coating may have multiple layers of liquid or aerosol jet coating compositions, thereby providing different thicknesses throughout the coating. The highest peak of a cross-section of a coating may be measured using microscopy (e.g., optical microscopy).

In methods of the present disclosure wherein multiple liquid or aerosol jet coating compositions are used, directing each of the multiple liquid or aerosol jet coating compositions comprises directing each of the multiple liquid or aerosol jet coating compositions to at least a portion of the coil substrate. The present disclosure also provides coated coil substrates, and items made from such coated coil substrates, having a surface at least partially coated with a coating prepared by methods of the present disclosure wherein multiple liquid or aerosol jet coating compositions are used. Such coil substrates and items made therefrom are analogous to that described herein made by the general methods that are described above.

The present disclosure also provides a coil coating system, comprising: multiple liquid or aerosol jet coating compositions, wherein at least two of the multiple liquid or aerosol jet coating compositions are different; wherein each liquid or aerosol jet coating composition is as described herein. Such systems preferably further include instructions comprising: directing each of the multiple liquid or aerosol jet coating compositions to at least a portion of a coil substrate such that at least one liquid or aerosol jet coating composition is deposited on another different liquid or aerosol jet coating composition (prior to or after at least partially hardening of the prior applied liquid or aerosol jet coating composition); and providing conditions effective for the multiple liquid or aerosol jet coating compositions to form a hardened, preferably continuous, adherent coating on at least a portion of the coil substrate.

Preferably, in such systems, at least two of the liquid or aerosol jet coating compositions differ in one or more chemical or physical properties. Such properties include polymer particle properties (such as molecular weight, density, glass transition temperature (Tg), melting temperature (Tm), intrinsic viscosity (IV), melt viscosity (MV), melt index (MI), crystallinity, arrangement of blocks or segments, monomer composition, availability of reactive sites, reactivity, and acid number), and coating composition properties (such as surface energy, hydrophobicity, oleophobicity, moisture or oxygen permeability, transparency, heat resistance, resistance to sunlight or ultraviolet energy, adhesion to metals, color or other visual effects, and recyclability). Preferably, a particular property of at least two different liquid or aerosol jet coating compositions differ by at least ±5%, at least ±10%, at least ±15%, at least ±25%, at least ±50%, at least ±100%, or more.

In such systems, the multiple liquid or aerosol jet coating compositions are typically contained in a plurality of cartridges, wherein each cartridge of the plurality of cartridges contains a liquid or aerosol jet coating composition, and wherein at least two cartridges of the plurality of cartridges contain different liquid or aerosol jet coating compositions (e.g., a differently colored liquid or aerosol jet coating composition). Preferably, such cartridges are refillable and reusable.

Patterned Coating Methods, Systems, and Resultant Products

The present disclosure also provides a method of coating a coil substrate that involves forming a patterned coating. This method uses any of the variety of liquid or aerosol jet coating compositions, including polymer particles and additives, and any of the general and cartridge-based systems and methods described herein. The general descriptions of the coatings also apply to the coatings that result from this method.

In particular, this method includes: providing a coil substrate; providing a liquid or aerosol jet coating composition, wherein the liquid or aerosol jet coating composition comprises polymer particles; selectively applying the liquid or aerosol jet coating composition on at least a portion of the coil substrate to form a patterned coating; and providing conditions effective for the liquid or aerosol jet coating composition to form a hardened adherent patterned coating on at least a portion of the coil substrate. This is a method of selectively applying or printing the liquid or aerosol jet coating composition.

A "patterned" coating (i.e., a multi-portion coating) refers to a hardened coating printed in two or more regions on a substrate surface, which may or may not have blank regions between and/or surrounding the printed regions having no coating thereon.

A patterned coating may include a regular or irregular pattern of coated regions, which may be in a variety of shapes (e.g., stripes, diamonds, squares, circles, ovals, rings). Such coated regions could be very discrete with clearly delineated transitions. Alternatively, such coated regions could provide gradient effects (e.g., in terms of color or matte/gloss) without clearly delineated transitions.

The terms "pattern" and "patterned" do not require any repetition in design elements, although such repetition may be present. The hardened coated regions of the patterned coating are preferably continuous in that they are free of pinholes and other coating defects that result in exposed substrate if an underlying coating is not present.

A patterned coating may be applied on another liquid or aerosol jet coating, whether it is an all-over coating or another patterned coating. A patterned coating may be applied to a conventional liquid-applied base coat.

Using a patterned coating method as described herein has a number of advantages. It provides the ability to do things in a selective and/or differential manner in a given coating, which is different from conventional methods. For example, the patterned coating could provide information in the form of markings. In this context, "markings" includes graphics, text, indicia, numbers, letters, code, communication means (e.g., as to when and where coated), and other visual images (e.g., faces such as those of celebrities, animals, characters, objects, artistic representations, and the like) including high resolution images. The markings could be present as portions within an overall layer, or could be applied as a second layer (i.e., with the edge boundaries of the layer substantially defined by the markings or each individual marking). The markings could be applied, e.g., by a customer, to a conventional continuous liquid-applied base coat already present.

Using a patterned coating method as described herein could result in a potential savings in the amount of liquid or aerosol jet coating composition consumed.

Multiple liquid or aerosol jet coating compositions, where at least two of the multiple liquid or aerosol jet coating compositions are different, may be used in the patterned coating method, as described for the multi-layer liquid or aerosol jet coating methods. For example, a method could involve directing a liquid or aerosol jet coating composition to at least a portion of a coil substrate to form a continuous coating, which may be a patterned coating or an all-over coating, before or after forming a patterned coating with a different liquid or aerosol jet composition. For images/printing, currently a patterned coating layer (i.e., a pattern layer) is used that is separate from a protective layer. The patterned coating method would allow for the pattern layer and performance layer to be accomplished in a single pass through the coating apparatus followed by a single hardening step as needed.

In another example that involves a patterned coating method that uses multiple liquid or aerosol jet coating compositions, each of the multiple liquid or aerosol jet coating compositions may be directed to at least a portion of the coil substrate such that at least one liquid or aerosol jet coating composition is optionally deposited on another different liquid or aerosol jet coating composition to form a coating. This could include multi-layer liquid or aerosol jet coatings. Alternatively, the multiple coating compositions could be directed to different, non-overlying areas (e.g., abutting areas that such a continuous coating is preferably formed), which is distinct from the multi-layer methods described herein.

As with the multi-layer liquid or aerosol jet coating methods, providing conditions effective for each of the multiple liquid or aerosol jet coating compositions to form a hardened coating involves providing conditions effective for each of the liquid or aerosol jet coating compositions to form a hardened coating between depositing layers of different liquid or aerosol jet coating compositions. Preferably, however, the method involves providing conditions effective for each of the liquid or aerosol jet coating compositions to form a hardened coating after depositing all the layers of different liquid or aerosol jet coating compositions.

A patterned coating may have different thicknesses across a coated surface as a result of the liquid or aerosol jet coating composition being deposited in different amounts, as described for the multi-layer coating method. This is advantageous when there is a need for a varied coating thickness across a substrate surface (i.e., an indexed variable thickness coating) for example, for coating performance and/or aesthetic purposes. Preferably, such coating thickness can be selectively varied on demand during application. Such selectivity cannot be achieved using a conventional roll-applied liquid coating process. To achieve selective variable thicknesses using such conventional process, expensive and permanent milling/etching of the application roll would be required. Furthermore, such conventional process could not provide the high degree of resolution that can be accomplished using a method of the present disclosure.

A patterned coating may also have different finishes. For example, at least a portion of the patterned coating may have a glossy finish. Alternatively, at least a portion of the patterned coating may have a matte finish. The patterned coating may have one or more gradient (e.g., gradual) transitions from a glossy finish area (i.e., region) to a matte finish area and/or one or more immediate transitions from a glossy finish area to a matte finish area. Such matte/glossy finishes can be determined using a gloss meter, such as a BYK-Gardner AG-4440 digital gloss meter.

The present disclosure also provides pattern-coated coil substrates and items that include such pattern-coated coil substrates. More specifically, a pattern-coated coil substrate is provided that is suitable for use in forming items, wherein at least a portion of the coil substrate has a surface coated with a hardened adherent patterned coating comprising liquid or aerosol jet coating compositions. Such items are analogous to those described herein made by the general methods that describe the use of a single liquid or aerosol jet coating composition.

The present disclosure also provides a coating system for patterned coating, comprising: one or more liquid or aerosol jet coating compositions; wherein each liquid or aerosol jet coating composition as described herein; and instructions comprising: selectively applying the one or more liquid or aerosol jet coating compositions on at least a portion of the coil substrate to form a patterned coating; and providing conditions effective for the one or more liquid or aerosol jet coating compositions to form a hardened adherent patterned coating (which may or may not be continuous) on at least a portion of the coil substrate.

Preferably, in such systems that include at least two different liquid or aerosol jet coating compositions, such compositions differ in one or more chemical or physical properties. Such properties include polymer particle properties (such as molecular weight, density, glass transition temperature (Tg), melting temperature (Tm), intrinsic viscosity (IV), melt viscosity (MV), melt index (MI), crystallinity, arrangement of blocks or segments, monomer composition, availability of reactive sites, reactivity, and acid number), and coating composition properties (such as surface energy, hydrophobicity, oleophobicity, moisture or oxygen permeability, transparency, heat resistance, resistance to sunlight or ultraviolet energy, adhesion to metals, color or other visual effects, and recyclability). Preferably, a particular property of at least two different liquid or aerosol jet coating compositions differ by at least ±5%, at least ±10%, at least ±15%, at least ±25%, at least ±50%, at least ±100%, or more.

Articles and Method of Making

The present disclosure also provides articles that includes a coated substrate as described herein.

Methods of making substrates can include: providing a coil substrate; applying a liquid jet or aerosol jet coating composition onto the coil substrate to form a hardened, preferably continuous, adherent coating disposed on at least a portion of a surface thereof, wherein: the substrate has an average thickness of up to 5 mm; the hardened, preferably continuous, adherent coating is formed from a liquid jet or aerosol jet coating composition; wherein the liquid jet or aerosol jet coating composition comprises polymer particles comprising a polymer having a number average molecular weight of at least 2000 Daltons, wherein the polymer particles have a particle size distribution having a D50 of less than 10 microns; and forming the substrate (e.g., by cutting or stamping) into an article.

The thickness of the coil substrate may be 250 m or greater, 300 m or greater, 350 m or greater, 400 m or greater, 450 m or greater, 500 m or greater, 600 m or greater, or 700 m or greater. The thickness of the coil substrate may be 5 mm or less, 3 mm or less, 2 mm or less, 1.5 mm or less, 1.3 mm or less, 1 mm or less, 800 m or less, 760 m or less, 700 m or less, 650 m or less, or 610 m or less.

EXEMPLARY EMBODIMENTS

Embodiments A: Liquid Jet or Aerosol Jet Coating Composition

Embodiment A-1 is a liquid jet or aerosol jet coating composition comprising: polymer particles comprising a polymer having a number average molecular weight of at least 2000 Daltons, wherein the polymer particles have a particle size distribution having a D50 of less than 10 microns; and a liquid carrier comprising water in a major amount of the liquid carrier.

Embodiment A-2 is the liquid jet or aerosol jet coating composition of Embodiment A-1, wherein the polymer particles have a particle size distribution having a D50 of less than 5 microns, less than 1 micron, or less than 0.5 micron.

Embodiment A-3 is the liquid jet or aerosol jet coating composition of Embodiment A-1 or A-2, wherein the polymer particles have a particle size distribution having a D90 of less than 10 microns, less than 5 microns, less than 1 micron, or less than 0.5 micron.

Embodiment A-4 is the liquid jet or aerosol jet coating composition of any of the preceding embodiments, wherein the polymer particles have a particle size distribution having a D95 of less than 10 microns, less than 5 microns, less than 1 micron, or less than 0.5 micron.

Embodiment A-5 is the liquid jet or aerosol jet coating composition of any of the preceding embodiments, wherein the polymer particles have a particle size distribution having a D99 of less than 10 microns, less than 5 microns, less than 1 micron, or less than 0.5 micron.

Embodiment A-6 is the liquid jet or aerosol jet coating composition of any of the preceding embodiments, wherein the polymer particles have a particle size distribution having a D50 (preferably, a D90, D95, or a D99) of at least 0.01 micron, at least 0.05 micron, or at least 0.1 micron.

Embodiment A-7 is the liquid jet or aerosol jet coating composition of any of the preceding embodiments having a solids content of at least 10 wt-%, at least 15 wt-%, or at least 20 wt-%, based on the total weight of the coating composition (prior to incorporating into a liquid jet or aerosol jet coating system).

Embodiment A-8 is the liquid jet or aerosol jet coating composition of any of the preceding embodiments having a solids content of up to 50 wt-%, up to 40 wt-%, or up to 30 wt-%, based on the total weight of the coating composition (prior to incorporating into a liquid jet or aerosol jet coating system).

Embodiment A-9 is the liquid jet or aerosol jet coating composition of any of the preceding embodiments comprising at least 30 wt-%, at least 50 wt-%, or at least 70 wt-%, of the polymer particles, based on the total solids content of the coating composition (i.e., the total weight of the overall hardened coating).

Embodiment A-10 is the liquid jet or aerosol jet coating composition of any of the preceding embodiments comprising up to 99 wt-%, up to 97 wt-%, or up to 95 wt-%, of the polymer particles, based on the total solids content of the coating composition (i.e., the total weight of the overall hardened coating).

Embodiment A-11 is the liquid jet or aerosol jet coating composition of any of the preceding embodiments, wherein the viscosity of the coating composition for a liquid jet application process is preferably at least 1 centipoise (cps), at least 10 cps, or at least 20 cps.

Embodiment A-12 is the liquid jet or aerosol jet coating composition of any of the preceding embodiments, wherein the viscosity of the coating composition for a liquid jet application process is preferably up to 50 centipoise (cps), up to 40 cps, or up to 30 cps.

Embodiment A-13 is the liquid jet or aerosol jet coating composition of any of the preceding embodiments, wherein the viscosity of the coating composition for an aerosol jet application process is preferably at least 1 centipoise (cps), at least 50 cps, or at least 100 cps.

Embodiment A-14 is the liquid jet or aerosol jet coating composition of any of the preceding embodiments, wherein the viscosity of the coating composition for an aerosol jet application process is preferably up to 1,000 centipoise (cps), up to 500 cps, or up to 200 cps.

Embodiment A-15 is the liquid jet or aerosol jet coating composition of any of the preceding embodiments, wherein the surface tension of the coating composition for a liquid or aerosol jet application process is at least 10 milliNewtons per meter (mN/m), at least 20 mN/m, or at least 30 mN/m.

Embodiment A-16 is the liquid jet or aerosol jet coating composition of any of the preceding embodiments, wherein the surface tension of the coating composition for a liquid or aerosol jet application process is up to 50 mN/m, up to 45 mN/m, or up to 40 mN/m.

Embodiment A-17 is the liquid jet or aerosol jet coating composition of any of the preceding embodiments, wherein the polymer particles comprise a thermoplastic polymer.

Embodiment A-18 is the liquid jet or aerosol jet coating composition of any of the preceding embodiments, wherein the polymer particles comprise a polymer having a melt flow index (measured pursuant to ASTM D1238-13 (2013) at 190° C. and with a 2.16-kilogram weight) of greater than 15 grams/10 minutes, greater than 50 grams/10 minutes, or greater than 100 grams/10 minutes.

Embodiment A-19 is the liquid jet or aerosol jet coating composition of any of the preceding embodiments, wherein the polymer particles comprise a polymer having a melt flow index of up to 200 grams/10 minutes, or up to 150 grams/10 minutes.

Embodiment A-20 is the liquid jet or aerosol jet coating composition of any of the preceding embodiments, wherein the polymer particles comprise a thermoset polymer.

Embodiment A-21 is the liquid jet or aerosol jet coating composition of any of the preceding embodiments, wherein the polymer particles comprise a polymer having a glass transition temperature (Tg) of at least 15° C., at least 20° C., or at least 25° C.

Embodiment A-22 is the liquid jet or aerosol jet coating composition of any of the preceding embodiments, wherein the polymer particles comprise a polymer having a Tg of up to 150° C., up to 125° C., up to 110° C., up to 100° C., up to 80° C., or up to 50° C.

Embodiment A-23 is the liquid jet or aerosol jet coating composition of any of the preceding embodiments, wherein the polymer particles comprise a crystalline or semi-crystalline polymer having a melting point of at least 40° C.

Embodiment A-24 is the liquid jet or aerosol jet coating composition of any of the preceding embodiments, wherein the polymer particles comprise a crystalline or semi-crystalline polymer having a melting point of up to 130° C.

Embodiment A-25 is the liquid jet or aerosol jet coating composition of any of the preceding embodiments, wherein the polymer particles comprise a polymer selected from a polyacrylic (e.g., a solution-polymerized acrylic polymer, an emulsion polymerized acrylic polymer, or combination thereof), polyether, polyolefin, polyester, polyurethane, polycarbonate, polystyrene, or a combination thereof (i.e., copolymer or mixture thereof such as polyether-acrylate copolymer). Preferably, the polymer is selected from a polyacrylic, polyether, polyolefin, polyester, or a combination thereof.

Embodiment A-26 is the liquid jet or aerosol jet coating composition of any of the preceding embodiments, wherein the polymer Mn is at least at least 3,000 Daltons or at least 4,000 Daltons.

Embodiment A-27 is the liquid jet or aerosol jet coating composition of any of the preceding embodiments, wherein the polymer Mn is up to 60,000 Daltons.

Embodiment A-28 is the liquid jet or aerosol jet coating composition of Embodiment A-27, wherein the polymer Mn is up to up to 40,000 Daltons or up to 20,000 Daltons.

Embodiment A-29 is the liquid jet or aerosol jet coating composition of any of the preceding embodiments, wherein the polymer has a polydispersity index (Mw/Mn) of less than 4, less than 3, less than 2, or less than 1.5.

Embodiment A-30 is the liquid jet or aerosol jet coating composition of any of the preceding embodiments further comprising one or more optional additives selected from lubricants, adhesion promoters, crosslinkers, catalysts, colorants (e.g., pigments or dyes), ferromagnetic particles, degassing agents, levelling agents, wetting agents, surfactants, flow control agents, heat stabilizers, anti-corrosion agents, adhesion promoters, inorganic fillers, and combinations thereof.

Embodiment A-31 is the liquid jet or aerosol jet coating composition of Embodiment A-30 further comprising one or more colorants.

Embodiment A-32 is the liquid jet or aerosol jet coating composition of Embodiment A-31, wherein the one or more colorants are present in the liquid jet or aerosol jet coating composition in an amount of at least 1 wt-%, at least 2 wt-%, at least 5 wt-%, at least 10 wt-%, or at least 15 wt-%, based on the total solids content of the coating composition (i.e., the total weight of the overall hardened coating).

Embodiment A-33 is the liquid jet or aerosol jet coating composition of Embodiment A-31 or A-32, wherein the one or more colorants are present in the liquid jet or aerosol jet coating composition in an amount of up to 50 wt-%, up to 40 wt-%, up to 30 wt-%, or up to about 20%, based on the total solids content of the coating composition (i.e., the total weight of the overall hardened coating).

Embodiment A-34 is the liquid jet or aerosol jet coating composition of any of Embodiments A-30 through A-33 further comprising one or more lubricants.

Embodiment A-35 is the liquid jet or aerosol jet coating composition of Embodiment A-34, wherein the one or more lubricants are present in the liquid jet or aerosol jet coating composition in an amount of at least 0.1 wt-%, at least 0.5 wt-%, or at least 1 wt-%, based on the total solids content of the coating composition (i.e., the total weight of the overall hardened coating).

Embodiment A-36 is the liquid jet or aerosol jet coating composition of Embodiment A-34 or A-35, wherein the one or more lubricants are present in the liquid jet or aerosol jet coating composition in an amount of up to 4 wt-%, up to 3 wt-%, or up to 2 wt-%, based on the total solids content of the coating composition (i.e., the total weight of the overall hardened coating).

Embodiment A-37 is the liquid jet or aerosol jet coating composition of any of Embodiments A-30 through A-36 further comprising one or more crosslinkers and/or catalysts.

Embodiment A-38 is the liquid jet or aerosol jet coating composition of Embodiment A-37 comprising one or more crosslinker in an amount of at least 0.1 wt-%, at least 1 wt-%, at least 2 wt-%, at least 5 wt-%, or at least 8 wt-%, based on the total solids content of the coating composition (i.e., the total weight of the overall hardened coating).

Embodiment A-39 is the liquid jet or aerosol jet coating composition of Embodiment A-37 or A-38 comprising one or more crosslinkers in an amount of up to 40 wt-%, up to 30 wt-%, up to 20 wt-%, or up to 10 wt-%, based on the total solids content of the coating composition (i.e., the total weight of the overall hardened coating).

Embodiment A-40 is the liquid jet or aerosol jet coating composition of any of Embodiments A-37 through A-39 comprising one or more catalysts in an amount of at least 0.01 wt-%, based on the total solids content of the coating composition (i.e., the total weight of the overall hardened coating).

Embodiment A-41 is the liquid jet or aerosol jet coating composition of any of Embodiments A-37 through A-40 comprising one or more catalysts in an amount of up to 5 wt-%, based on the total solids content of the coating composition (i.e., the total weight of the overall hardened coating).

Embodiment A-42 is the liquid jet or aerosol jet coating composition of any of the preceding embodiments which is substantially free of each of bisphenol A, bisphenol F, and bisphenol S.

Embodiment A-43 is the liquid jet or aerosol jet coating composition of any of the preceding embodiments which is substantially free of all bisphenol compounds, except for TMBPF (which may be optionally present as a structural unit).

Embodiment A-44 is the liquid jet or aerosol jet coating composition of any of the preceding embodiments which forms a coating that includes less than 50 ppm, less than 25 ppm, less than 10 ppm, or less than 1 ppm, extractables, if any, when tested pursuant to the Global Extraction Test.

Embodiment A-45 is the liquid jet or aerosol jet coating composition of any of the preceding embodiments which forms a coating that adheres to a substrate, such as a liquid jet or aerosol jet coating composition substrate, according to the Adhesion Test with an adhesion rating of 9 or 10, preferably 10.

Embodiment A-46 is the liquid jet or aerosol jet coating composition of any of the preceding embodiments which forms a hardened, preferably continuous, coating that is free of pinholes and other coating defects that result in exposed substrate.

Embodiments B: Methods of Coating a Coil Substrate and Coated Coils

Embodiment B-1 is a method of coating a coil substrate, the method comprising: providing a liquid jet or aerosol jet coating composition of any of Embodiments A; directing the liquid jet or aerosol jet coating composition to at least a portion of the coil substrate; and providing conditions effective for the liquid jet or aerosol jet coating composition to form a hardened, preferably continuous, adherent coating on at least a portion of the coil substrate.

Embodiment B-2 is a method of coating coil substrate, the method comprising: providing a coil substrate; providing a liquid jet or aerosol jet coating composition of any of Embodiments A; selectively applying the liquid jet or aerosol jet coating composition to at least a portion of the coil substrate to form a patterned coating; and providing conditions effective for the liquid jet or aerosol jet coating composition to form a hardened adherent patterned coating on at least a portion of the coil substrate.

Embodiment B-3 is a method of coating a coil substrate, the method comprising: providing a coil substrate; providing multiple liquid jet or aerosol jet coating compositions of any of Embodiments A, wherein at least two of the multiple liquid jet or aerosol jet coating compositions are different; directing each of the multiple coating compositions to at least a portion of the coil substrate such that at least one coating composition is deposited on another different coating composition (either prior to or after hardening of the underlying coating composition to form a coating); and providing conditions effective for the multiple liquid jet or aerosol jet coating compositions to form a hardened, preferably continuous, adherent coating on at least a portion of the coil substrate.

Embodiment B-4 is the method of any of the preceding embodiments B, wherein providing conditions effective for the liquid jet or aerosol jet coating compositions to form a hardened coating on at least a portion of the coil substrate comprises applying thermal energy (e.g., using a convection oven or induction coil), UV radiation, IR radiation, or electron beam radiation to the powder coating compositions.

Embodiment B-5 is the method of embodiment B-4, wherein providing conditions comprises applying thermal energy.

Embodiment B-6 is the method of embodiment B-5, wherein applying thermal energy comprises applying thermal energy at a temperature of at least 100° C. or at least 177° C.

Embodiment B-7 is the method of embodiment B-5 or B-6, wherein applying thermal energy comprises applying thermal energy at a temperature of up to 300° C. or up to 250° C.

Embodiment B-8 is the method of any of the preceding embodiments B, wherein the coil substrate comprises steel, stainless steel, electrogalvanized steel, tin-free steel (TFS), tin-plated steel, electrolytic tin plate (ETP), or aluminum.

Embodiment B-9 is the method of any of the preceding Embodiments B, wherein the coil substrate is a cryogenically cleaned coil substrate.

Embodiment B-10 is the method of any of the preceding Embodiments B, further comprising cryogenically cleaning the coil substrate prior to directing each of the multiple powder coating compositions to at least a portion of the coil substrate.

Embodiment B-11 is the method of any of the preceding Embodiments B, wherein the coil substrate has an average thickness of 250 m or greater, 300 m or greater, 350 m or greater, 400 m or greater, 450 m or greater, 500 m or greater, 600 m or greater, or 700 m or greater.

Embodiment B-12 is the method of any of the preceding Embodiments B, wherein the coil substrate has an average thickness of 5 mm or less, 3 mm or less, 2 mm or less, 1.5 mm or less, 1.3 mm or less, 1 mm or less, 800 m or less, 760 m or less, 700 m or less, 650 m or less, or 610 m or less.

Embodiment B-13 is the method of any of the preceding Embodiments B, wherein the hardened adherent coating has an average thickness of up to 100 microns, or a maximum thickness up to 100 microns.

Embodiment B-14 is the method of Embodiment B-13, wherein the hardened adherent coating has an average thickness of up to 50 microns, preferably up to 25 microns (e.g., up to 20 microns, up to 15 microns, up to 10 microns, or up to 5 microns).

Embodiment B-15 is the method of any of the preceding Embodiments B, wherein the hardened adherent coating has an average thickness of at least 1 micron (or at least 2 microns, at least 3 microns, or at least 4 microns).

Embodiment B-16 is a coated coil substrate having a surface at least partially coated with a coating prepared by the method of any of the preceding embodiments B.

Embodiment B-17 is the coated coil substrate of embodiment B-16, wherein the substrate is a drawn and redrawn substrate.

Embodiment B-18 is the method of any of the preceding Embodiments B, wherein the liquid jet or aerosol jet coating composition is applied to at least a portion of the coil substrate via a plurality of liquid jetting nozzles distributed evenly across a surface of a cylindrical print head.

Embodiments C: Multilayer Coating Methods and Systems

Embodiment C-1 is a method of coating a coil substrate, the method comprising: providing a coil substrate; providing multiple liquid or aerosol jet coating compositions, wherein each liquid or aerosol jet coating composition comprises polymer particles, and at least two of the multiple liquid or aerosol jet coating compositions are different; directing each of the multiple liquid or aerosol jet coating compositions to at least a portion of the coil substrate such that at least one liquid or aerosol jet coating composition is deposited on another different liquid or aerosol jet coating composition (prior to or after at least hardening the one or more different underlying liquid or aerosol jet coating composition); and providing conditions effective for the multiple liquid or aerosol jet coating compositions to form a hardened, preferably continuous, adherent coating on at least a portion of the coil substrate; wherein each liquid or aerosol jet coating composition comprises: polymer particles comprising a polymer having a number average molecular weight of at least 2000 Daltons, wherein the polymer particles have a particle size distribution having a D50 of less than 10 microns.

Embodiment C-2 is the method of Embodiment C-1, wherein providing conditions effective comprises providing conditions effective for each of the liquid or aerosol jet coating compositions to form a hardened, preferably continuous, adherent coating between depositing layers of different liquid or aerosol jet coating compositions (e.g., by heating each respectively deposited layer).

Embodiment C-3 is the method of Embodiment C-1, wherein providing conditions effective comprises providing conditions effective for each of the liquid or aerosol jet coating compositions to form a hardened, preferably continuous, adherent coating after depositing all the layers of different liquid or aerosol jet coating compositions.

Embodiment C-4 is the method of any of the preceding Embodiments C, wherein the different liquid or aerosol jet coating compositions are chemically different.

Embodiment C-5 is the method of Embodiment C-4, wherein the different liquid or aerosol jet coating compositions are in different colors, and the method results in color-on-color printing.

Embodiment C-6 is the method of Embodiment C-5, wherein the liquid or aerosol jet coating composition deposited as the outermost (i.e., top) coating forms a clear coating.

Embodiment C-7 is the method of any of the preceding Embodiments C, wherein the different liquid or aerosol jet coating compositions provide different functions.

Embodiment C-8 is the method of Embodiment C-7, wherein a first liquid or aerosol jet coating composition is deposited to provide a relatively soft, flexible primer layer, and a second liquid or aerosol jet coating composition is deposited on the first liquid or aerosol jet coating composition to provide a relatively hard, abrasion-resistant top coating.

Embodiment C-9 is the method of any of the preceding Embodiments C, wherein the different liquid or aerosol jet coating compositions are deposited in different amounts to form coating layers having different thicknesses.

Embodiment C-10 is the method of any of the preceding Embodiments C, wherein the multiple liquid or aerosol jet coating compositions are deposited in a manner to form a textured surface.

Embodiment C-11 is the method of any of Embodiments C-1 through C-9, wherein the multiple liquid or aerosol jet coating compositions are deposited in a manner to form a smooth surface.

Embodiment C-12 is the method of any of the preceding Embodiments C, wherein the hardened, preferably continuous, adherent coating forms markings.

Embodiment C-13 is the method of any of the preceding Embodiments C, wherein the coil substrate is a cryogenically cleaned coil substrate.

Embodiment C-14 is the method of any of the preceding Embodiments C, further comprising cryogenically cleaning the coil substrate prior to directing each of the multiple liquid or aerosol jet coating compositions to at least a portion of the coil substrate.

Embodiment C-15 is the method of any of the preceding Embodiments C, wherein the coil substrate has an average thickness of 300 m or greater, 400 m or greater, 500 m or greater, 600 m or greater, or 700 m or greater.

Embodiment C-16 is the method of any of the preceding Embodiments C, wherein the coil substrate has an average thickness of 5 mm or less, 3 mm or less, 2 mm or less, 1.5 mm or less, 1.2 mm or less, 1 mm or less, 800 m or less, or 700 m or less.

Embodiment C-17 is the method of any of the preceding Embodiments C, wherein the hardened adherent coating has an average total thickness of up to 100 microns, or a maximum thickness up to 100 microns.

Embodiment C-18 is the method of Embodiment C-17, wherein the hardened adherent coating has an average total thickness of up to 50 microns, preferably up to 25 microns (e.g., up to 20 microns, up to 15 microns, up to 10 microns, or up to 5 microns).

Embodiment C-19 is the method of any of the preceding Embodiments C, wherein the hardened adherent coating has an average total thickness, or a minimum thickness, of at least 1 micron (or at least 2 microns, at least 3 microns, or at least 4 microns).

Embodiment C-20 is the method of any of the preceding Embodiments C, wherein one or more of the multiple liquid or aerosol jet coating compositions comprise polymer particles comprising a polymer having a number average molecular weight of at least 2000 Daltons (or at least 5,000 Daltons, at least 10,000 Daltons, or at least 15,000 Daltons).

Embodiment C-21 is the method of any of the preceding Embodiments C, wherein one or more of the multiple liquid or aerosol jet coating compositions comprise polymer particles comprising a polymer having a number average molecular weight of up to 10,000,000 Daltons (or up to 1,000,000 Daltons, up to 100,000 Daltons, or up to 20,00 Daltons).

Embodiment C-22 is the method of any of the preceding Embodiments C, wherein one or more of the multiple liquid or aerosol jet coating compositions comprise polymer particles comprising a polymer having a polydispersity index (Mw/Mn) of less than 4 (or less than 3, less than 2, or less than 1.5).

Embodiment C-23 is the method of any of Embodiments C-20 through C-22, wherein one or more of the multiple liquid or aerosol jet coating compositions comprise the polymer in an amount of at least 40 wt-%, at least 50 wt-%, at least 60 wt-%, at least 70 wt-%, at least 80 wt-%, at least 90 wt-%, or at least 95 wt-%.

Embodiment C-24 is the method of any of the preceding Embodiments C, wherein one or more of the multiple liquid or aerosol jet coating compositions comprise polymer particles having a particle size distribution having a D50 of less than 5 microns (or less than 1 micron, or less than 0.5 micron).

Embodiment C-25 is the method of any of the preceding Embodiments C, wherein one or more of the multiple liquid or aerosol jet coating compositions comprise polymer particles having a particle size distribution having a D90 of less than 5 microns (or less than 1 micron, or less than 0.5 micron).

Embodiment C-26 is a packaging coating system, comprising: multiple liquid or aerosol jet coating compositions, wherein at least two of the multiple liquid or aerosol jet coating compositions are different; wherein each liquid or aerosol jet coating composition comprises polymer particles comprising a polymer having a number average molecular weight of at least 2000 Daltons, wherein the polymer particles have a particle size distribution having a D50 of less than 10 microns.

Embodiment C-27 is the system of Embodiment C-26, further comprising instructions comprising: directing each of the multiple liquid or aerosol jet coating compositions to at least a portion of a coil substrate such that at least one liquid or aerosol jet coating composition is deposited on another different liquid or aerosol jet coating composition; and providing conditions effective for the multiple liquid or aerosol jet coating compositions to form a hardened, preferably continuous, adherent coating on at least a portion of the coil substrate.

Embodiment C-28 is the system of Embodiment C-26 and D-27, wherein at least two of the liquid or aerosol jet coating compositions differ in one or more chemical or physical properties.

Embodiment C-29 is the system of Embodiment C-28, wherein the properties include polymer particle properties (such as molecular weight, density, glass transition temperature (Tg), melting temperature (Tm), intrinsic viscosity (IV), melt viscosity (MV), melt index (MI), crystallinity, arrangement of blocks or segments, availability of reactive sites, reactivity, acid number), and coating composition properties (such as surface energy, hydrophobicity, oleophobicity, moisture or oxygen permeability, transparency, heat resistance, resistance to sunlight or ultraviolet energy, adhesion to metals, color or other visual effects, and recyclability).

Embodiment C-30 is the system of Embodiment C-28 or D-29, wherein a particular property of at least two different liquid or aerosol jet coating compositions differ by at least ±5%, at least ±10%, at least ±15%, at least ±25%, at least ±50%, at least ±100%, or more.

Embodiments D: Patterned Coating Methods, Systems, and Resultant Products

Embodiment D-1 is a method of coating a coil substrate, the method comprising: providing a coil substrate; providing a liquid or aerosol jet coating composition, wherein the liquid or aerosol jet coating composition comprises polymer particles; selectively applying the liquid or aerosol jet coating composition on at least a portion of the coil substrate to form a patterned coating; and providing conditions effective for the liquid or aerosol jet coating composition to form a hardened adherent patterned coating (which may or may not be continuous) on at least a portion of the coil substrate.

Embodiment D-2 is the method of Embodiment D-1, wherein the hardened adherent patterned coating forms markings.

Embodiment D-7 is the method of any of the preceding Embodiments D, wherein the liquid or aerosol jet coating composition is intentionally and selectively deposited in different amounts to form a coating having different thicknesses across the coated surface.

Embodiment D-8 is the method of the preceding Embodiments D, further comprising directing a different liquid or aerosol jet coating composition to at least a portion of the coil substrate to form a hardened, preferably continuous, adherent coating, which may be a patterned coating or an all-over coating, before or after forming the patterned coating. In certain embodiments of the preceding Embodiments D, the method further comprises applying a conventional liquid coating to the coil substrate to form an all-over coating before forming the patterned coating.

Embodiment D-9 is the method of any of the preceding Embodiments D, wherein: providing a liquid or aerosol jet coating composition comprises providing multiple liquid or aerosol jet coating compositions, wherein each liquid or aerosol jet coating composition comprises polymer particles, and at least two of the multiple liquid or aerosol jet coating compositions are different; directing the liquid or aerosol jet coating composition comprises directing each of the multiple liquid or aerosol jet coating compositions to at least a portion of the coil substrate such that at least one liquid or aerosol jet coating composition is optionally deposited on another different liquid or aerosol jet coating composition to form a coating; and providing conditions comprise providing conditions effective for each of the multiple liquid or aerosol jet coating compositions to form a hardened, preferably continuous, adherent coating.

Embodiment D-10 is the method of Embodiment D-8 or D-9, wherein providing conditions comprise providing conditions effective for each of the liquid or aerosol jet coating compositions to form a hardened, preferably continuous, adherent coating between depositing layers of different liquid or aerosol jet coating compositions.

Embodiment D-11 is the method of Embodiment D-8 or D-9, wherein providing conditions effective comprises providing conditions effective for each of the liquid or aerosol jet coating compositions to form a hardened, preferably continuous, adherent coating after depositing all the layers of different liquid or aerosol jet coating compositions.

Embodiment D-12 is the method of any of Embodiments D-8 through D-11, wherein the different liquid or aerosol jet coating compositions are chemically different.

Embodiment D-13 is the method of Embodiment D-12, wherein the different liquid or aerosol jet coating compositions are in different colors, and the method results in color-on-color printing.

Embodiment D-14 is the method of Embodiment D-13, wherein the liquid or aerosol jet coating composition deposited as the outermost (i.e., top) coating forms a clear coating.

Embodiment D-15 is the method of any of Embodiments D-8 through D-14, wherein the different liquid or aerosol jet coating compositions provide different functions.

Embodiment D-16 is the method of Embodiment D-15, wherein a first liquid or aerosol jet coating composition is deposited to provide a relatively soft, flexible, primer layer, and a second liquid or aerosol jet coating composition is deposited on the first liquid or aerosol jet coating composition to provide a relatively hard, abrasion-resistant top coating.

Embodiment D-17 is the method of any of Embodiments D-8 through D-16, wherein the different liquid or aerosol jet coating compositions are deposited in different amounts to form coating layers having different thicknesses.

Embodiment D-18 is the method of any of the preceding Embodiments D, wherein the one or more liquid or aerosol jet coating compositions are deposited in a manner to form a textured surface, or in a manner to form a smooth surface.

Embodiment D-19 is the method of any of the preceding Embodiments D, wherein the one or more liquid or aerosol jet coating compositions are deposited in a manner to form a gradient pattern.

Embodiment D-20 is the method of any of the preceding Embodiments D, wherein the coil substrate is a cryogenically cleaned coil substrate.

Embodiment D-21 is the method of any of the preceding Embodiments D, further comprising cryogenically cleaning the coil substrate prior to directing each of the liquid or aerosol jet coating composition(s) to at least a portion of the coil substrate.

Embodiment D-22 is the method of any of the preceding Embodiments D, wherein the coil substrate has an average thickness of 300 m or greater, 400 m or greater, 500 m or greater, 600 m or greater, or 700 m or greater.

Embodiment D-23 is the method of any of the preceding Embodiments D, wherein the coil substrate has an average thickness of 5 mm or less, 3 mm or less, 2 mm or less, 1.5 mm or less, 1.2 mm or less, 1 mm or less, 800 m or less, or 700 m or less.

Embodiment D-24 is the method of any of the preceding Embodiments D, wherein the hardened adherent patterned coating has an average total thickness of up to 100 microns, or a maximum total thickness up to 100 microns.

Embodiment D-25 is the method of Embodiment D-24, wherein the hardened adherent patterned coating has an average total thickness of up to 50 microns, preferably up to 25 microns (e.g., up to 20 microns, up to 15 microns, up to 10 microns, or up to 5 microns).

Embodiment D-26 is the method of any of the preceding Embodiments D, wherein the hardened adherent patterned coating has an average total thickness, or a minimum thickness, of at least 1 micron (or at least 2 microns, at least 3 microns, or at least 4 microns).

Embodiment D-27 is the method of any of the preceding Embodiments D, wherein one or more of the liquid or aerosol jet coating compositions comprise polymer particles (preferably, spray dried polymer particles) comprising a polymer having a number average molecular weight of at least 2000 Daltons (or at least 5,000 Daltons, at least 10,000 Daltons, or at least 15,000 Daltons).

Embodiment D-28 is the method of any of the preceding Embodiments D, wherein one or more of the liquid or aerosol jet coating compositions comprise polymer particles comprising a polymer having a number average molecular weight of up to 10,000,000 Daltons (or up to 1,000,000 Daltons, up to 100,000 Daltons, or up to 20,00 Daltons).

Embodiment D-29 is the method of any of the preceding Embodiments D, wherein one or more of the liquid or aerosol jet coating compositions comprise polymer particles comprising a polymer having a polydispersity index (Mw/Mn) of less than 4 (or less than 3, less than 2, or less than 1.5).

Embodiment D-30 is the method of any of the preceding Embodiments D, wherein one or more of the liquid or aerosol jet coating compositions comprise polymer particles having a particle size distribution having a D50 of less than 10 microns (or less than 5 microns, less than 1 micron, or less than 0.5 micron), or a D90 of less than 10 microns (or less than 5 microns, less than 1 micron, or less than 0.5 micron).

Embodiment D-31 is a pattern-coated coil substrate, wherein at least a portion of the coil substrate has a surface coated with a hardened adherent patterned coating prepared according to any of the preceding Embodiments D.

Embodiment D-32 is an item comprising a coil substrate having a surface at least partially coated with a coating prepared by the method of any of Embodiments D-1 through D-30.

Embodiment D-33 is a coating system for patterned coating, comprising: one or more liquid or aerosol jet coating compositions; wherein each liquid or aerosol jet coating composition comprises polymer particles comprising a polymer having a number average molecular weight of at least 2000 Daltons, wherein the polymer particles have a particle size distribution having a D50 of less than 10 microns; and instructions comprising: directing the one or more liquid or aerosol jet coating compositions to at least a portion of the coil substrate to form a patterned coating; and providing conditions effective for the one or more liquid or aerosol jet coating compositions to form a hardened adherent patterned coating (which may or may not be continuous) on at least a portion of the coil substrate.

Embodiment D-34 is the system of Embodiment D-33 comprising at least two different liquid or aerosol jet coating compositions that differ in one or more chemical or physical properties.

Embodiment D-35 is the system of Embodiment D-34, wherein the properties include polymer particle properties (such as molecular weight, density, glass transition temperature (Tg), melting temperature (Tm), intrinsic viscosity (IV), melt viscosity (MV), melt index (MI), crystallinity, arrangement of blocks or segments, availability of reactive sites, reactivity, acid number), and coating composition properties (such as surface energy, hydrophobicity, oleophobicity, moisture or oxygen permeability, transparency, heat resistance, resistance to sunlight or ultraviolet energy, adhesion to metals, color or other visual effects, and recyclability).

Test Methods

Unless indicated otherwise, the following test methods may be utilized.

Adhesion Test

Adhesion testing was performed according to ASTM D 3359-17 (2017), Test Method B, for coatings ≤125 microns thick, using SCOTCH 610 tape (available from 3M Company of Saint Paul, MN) and a lattice pattern consisting of 4 scratches across and 4 scratches down (roughly 1-2 mm apart). The test is typically repeated 3 times per sample. Adhesion is rated on a scale of 0-10 where a rating of "10" indicates no adhesion failure, a rating of "9" indicates 90% of the coating remains adhered, a rating of "8" indicates 80% of the coating remains adhered, and so on. Adhesion ratings of 9 or 10 are typically desired for commercially viable coatings. Thus, herein, an adhesion rating of 9 or 10, preferably 10, is considered to be adherent.

Differential Scanning Calorimetry for Tg

Samples of the overall hardened coating for differential scanning calorimetry ("DSC") testing are weighed into standard sample pans, and analyzed using the standard DSC heat-cool-heat method. The samples are equilibrated at −60° C., then heated at 20° C. per minute to 200° C., cooled to −60° C., and then heated again at 20° C. per minute to 200° C. Glass transition temperatures are calculated from the thermogram of the last heat cycle. The glass transition is measured at the inflection point of the transition.

Molecular Weight Determination by Gel Permeation Chromatography

Samples for Gel Permeation Chromatography ("GPC") testing are prepared by first dissolving the overall hardened coating in a suitable solvent (e.g., THE if appropriate for a given overall hardened coating). An aliquot of this solution is then analyzed by GPC along with mixtures of polystyrene ("PS") standards. The molecular weights of the samples are calculated after processing the GPC runs and verifying the standards.

Weather Resistance

The test is typically performed using an unfiltered weatherometer, preferably a carbon arc unfiltered weatherometer, where the coating is exposed to unfiltered UV radiation for a fixed period of time (e.g., 500 hours, 1000 hours, and the like) intended to simulate direct exposure to sunlight for several years, and under more harsh conditions than conventional accelerated weather testing such as QUV testing, for example. Without limiting to theory, a combination of a glass flake additive of a particular particle size and optimal thickness of the second coating may combine to provide a weather-resistant coating. In an aspect, the coating composition described herein provides weather resistance comparable or even superior to a conventional coating when subjected to weathering testing over a period of 1000 hours.

Pencil Hardness Test

Hardness of the coil coatings described above may be testing using a pencil hardness test according to ASTM D3363 or a modification thereof.

Detergent Resistance Test

Detergent resistance can be determined using a test such as ASTM DD2248 or a modification thereof for example.

Water Resistance Test

Water resistance can be determined using a test such as ASTM D870 or a modification thereof for example.

Corrosion Resistance Test

Corrosion resistance can be determined using a test such as ASTM G85 Annex 5 or a modification thereof for example.

The complete disclosures of the patents, patent documents, and publications cited herein are incorporated by reference in their entirety as if each were individually incorporated. To the extent that there is any conflict or discrepancy between this specification as written and the disclosure in any document that is incorporated by reference herein, this specification as written will control. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the embodiments set forth herein as follows.

What is claimed is:

1. A method of coating a coil metal substrate, the method comprising:

directing a liquid jet or aerosol jet coating composition to at least a portion of the coil metal substrate, the liquid jet or aerosol jet coating composition comprising:

polymer particles comprising a polymer having a number average molecular weight of at least 2000 Daltons, wherein the polymer particles have a particle size distribution having a D50 of less than 10 microns; and a liquid carrier comprising water in a major amount of the liquid carrier; and providing conditions effective for the liquid jet or aerosol jet coating composition to form a hardened continuous adherent weather-resistant coating on at least a portion of the coil metal substrate;

wherein the coil metal substrate comprises aluminum, iron, copper, tin, steel, an alloy thereof, or a combination thereof;

wherein the coil metal substrate has an average thickness of 300 μm or greater and 5 mm or less; and wherein the weather-resistant coating provides weather resistance when subjected to weathering testing over a period of 1000 hours.

2. The method of claim 1, wherein the polymer particles have a particle size distribution having a D50 of less than 5 microns.

3. The method of claim 1 wherein the polymer particles comprise a thermoplastic polymer.

4. The method of claim 1, wherein the directing comprises selectively applying the liquid jet or aerosol jet coating composition to at least a portion of the coil metal substrate to form a patterned coating.

5. The method of claim 1, further comprising providing multiple liquid jet or aerosol jet coating compositions, wherein at least two of the multiple liquid jet or aerosol jet coating compositions are different and wherein at least one coating composition is deposited on another different coating composition.

6. An article formed from a coated coil metal substrate having a surface at least partially coated with a weather-resistant coating prepared by the method of claim 1.

7. The article of claim 6, wherein the coated coil metal substrate is formed into a building panel, a metal roof panel, a wall panel, a garage door, office furniture, a home appliance, a heating or cooling panel, an automotive panel or part, or an architectural metal skin.

8. The method of claim 5, wherein the different liquid or aerosol jet coating compositions are chemically different.

9. The method of claim 5, wherein the different liquid or aerosol jet coating compositions are in different colors, and the method results in color-on-color printing.

10. The method of claim 5, wherein the multiple liquid or aerosol jet coating compositions are deposited in a manner to form a textured surface.

11. The method of claim 1, further comprising cryogenically cleaning the coil substrate prior to directing the liquid or aerosol jet coating compositions to at least a portion of the coil substrate.

12. The method of claim 1, wherein the coil substrate comprises steel, stainless steel, electrogalvanized steel, tin-free steel (TFS), tin-plated steel, electrolytic tin plate (ETP), or aluminum.

13. The method of claim 1, wherein providing conditions effective for the liquid jet or aerosol jet coating compositions to form a hardened weather-resistant coating on at least a portion of the coil substrate comprises applying thermal energy, UV radiation, IR radiation, or electron beam radiation to the powder coating composition.

14. A coated coil metal substrate comprising a coil metal substrate having a surface at least partially coated with a weather-resistant coating prepared by the method of claim 1.

15. The coated coil metal substrate of claim 14, wherein the hardened adherent weather-resistant coating has an average thickness of at least 1 micron.

16. The coated coil metal substrate of claim 14, wherein the substrate is a drawn and redrawn substrate.

17. The coated coil metal substrate of claim 14, wherein the hardened adherent weather-resistant coating comprises two or more layers.

18. The substrate of claim 14, wherein the polymer particles comprise a polyurethane or a vinyl polymer.

19. The substrate of claim 14, wherein the coating does not include aromatic constituents.

20. The coated coil substrate of claim 15, wherein the hardened adherent weather-resistant coating has an average total thickness of up to 100 microns.

* * * * *